United States Patent [19]
Hata

[11] Patent Number: 5,411,686
[45] Date of Patent: May 2, 1995

[54] METHOD AND APPARATUS FOR CONTROLLING INJECTION MOLDING

[75] Inventor: Masaharu Hata, Utsunomiya, Japan

[73] Assignee: Kao Corporation, Tokyo, Japan

[21] Appl. No.: 995,715

[22] Filed: Dec. 23, 1992

[30] Foreign Application Priority Data

Dec. 26, 1991 [JP] Japan .................... 3-356697

[51] Int. Cl.6 .............. B29C 45/72; B29C 45/73
[52] U.S. Cl. ............... 264/40.6; 264/328.16; 264/328.14; 425/143; 425/144; 425/547; 425/552
[58] Field of Search ............ 264/40.1, 40.6, 40.7, 264/328.16, 328.14; 425/139, 143, 144, 547, 552

[56] References Cited

U.S. PATENT DOCUMENTS

| | | | |
|---|---|---|---|
| 3,822,108 | 7/1974 | Mihalik | 425/143 |
| 3,860,801 | 1/1975 | Hunkar | 425/144 |
| 4,034,952 | 7/1977 | Stewart | 425/143 |
| 4,183,448 | 1/1980 | Narh | 425/144 |
| 4,311,446 | 1/1982 | Hold et al. | 425/144 |
| 4,378,963 | 4/1983 | Schouenberg | 425/144 |
| 4,642,043 | 2/1987 | Schwarzkopf | 425/143 |
| 4,875,845 | 10/1989 | Hara et al. | 425/143 |
| 5,055,025 | 10/1991 | Muller | 425/144 |

*Primary Examiner*—Mathieu D. Vargot
*Attorney, Agent, or Firm*—Fish & Richardson

[57] ABSTRACT

The state in which a mold is filled with molten resin is held constant at all times by holding constant the temperature of the mold at the start of injection of the resin, thus suppressing a fluctuation in the weight and dimensions of the molded articles. Cooling channel are arranged around a cavity of an injection mold filled with a heated molten resin. Use is made of a response model of a variation in mold temperature in the injection mold. The variation in mold temperature, coolant temperature and temperature of the filling molten resin in a molding cycle are measured, and a parameter (time constant) of the response model is decided using these measured values. If the molding cycle is changed or the measured mold temperature develops a difference with respect to a standard mold temperature, a target value of coolant temperature is calculated using the response model in such a manner that the mold temperature at the start of injection will be held constant at all times, and control of the coolant temperature is carried out using this target coolant temperature.

19 Claims, 16 Drawing Sheets

Fig. 10

| | | STANDARD STATE PRIOR TO CYCLE CHANGE | AFTER CYCLE CHANGE | |
|---|---|---|---|---|
| | | | WITHOUT CONTROL | WITH CONTROL |
| MOLDING CYCLE | (SEC) | 9.5 | 13.5 | 13.5 |
| MOLD TEMPERATURE AT START OF INJECTION | (°C) | 45.6 | 38.3 | 44.2 |
| RESIN TEMPERATURE | (°C) | 329 | 323 | 323 |
| RESIN PRESSURE IN MOLD CAVITY | (kg/cm$^3$) | 376 | 386 | 380 |
| WEIGHT OF MOLDED ARTICLE | (g) | 121.9 | 122.3 | 121.9 |
| VARIATION IN WEIGHT | (%) | | +0.34 | +0.03 |
| VARIATION IN DENSITY | (%) | | +0.19 | +0.03 |

METHOD AND APPARATUS FOR CONTROLLING INJECTION MOLDING

BACKGROUND OF THE INVENTION

1. Field of the Invention

This invention relates to a method and apparatus for controlling injection molding. More particularly, the invention relates to a method and apparatus for controlling injection molding which uses a mold or molding machine having a temperature adjusting section for adjusting the temperature of a molten resin, wherein control is performed in such a manner that mold temperature, molten resin temperature and molded-article ejection temperature will be held at a predetermined constant temperature or will attain the aforesaid constant temperature in as short a time as possible.

2. Description of the Related Art

In injection molding, maintaining the quality (weight, dimensions, amount of warpage, etc.) of the molded articles is important in order to achieve stable production. However, where there is a fluctuation in the properties of the material (resin) used, a fluctuation in the machinery (the molding machine) or a change in the environment (voltage and current), there is a variation of the state in which the resin is injected into the mold and, hence, a fluctuation in the quality of the molded articles.

Even if the aforementioned fluctuations (the fluctuations in properties, machinery and environment) do not occur, a fluctuation in the quality of the molded articles still occurs in the following cases:

(i) when the molding cycle is changed;
(ii) when there is a decline in cooling efficiency owing to contamination of the mold cooling channels, etc.; and
(iii) when the molding operation is started up (i.e., when the molding machine is started up).

Item (i) above is important when the output (amount of production) of molded articles is changed. For example, if, in a case where output is to be curtailed, the molding machine is shut down after production of the necessary amount of molded articles has been completed, restarting the molding machine requires a great amount of labor. In addition, material is wasted at start-up. In a case where output is curtailed, therefore, it is advisable to lengthen the molding cycle and keep the molding machine in a continuously operating state without stopping it.

The factors which influence the quality of the molded articles will now be described taking the item (i) above, in which the molding cycle is changed, as a typical example.

FIG. 1 illustrates the temperature distribution in a mold at a certain time, wherein a molded article is being cooled during a molding cycle.

Formed within the mold 1 is a cavity 2 filled with a molten resin that has been injected into the cavity. A cooling channel 4 passes in the vicinity of the cavity 2 and carries coolant that flows through it. Temperature is highest at the center of the molten resin within the cavity 2 and declines as the water channel 4 is approached through mold 1. In the description that follows, let the temperature at a prescribed location M near the cavity 2 be represented by mold temperature $T_m$.

FIG. 2 illustrates the manner in which the mold temperature $T_m$ changes with time in a molding cycle. The molding cycle begins with the injection of the molten resin into the mold. The injection process is followed by a dwell process, which in turn is followed by a cooling process. Though the cooling of the resin within the cavity of the mold begins at the moment of injection, it will be assumed here for convenience sake that the cooling process extends from the moment the dwell process ends to the moment the molded article is extracted from the mold. The mold temperature $T_m$ rises sharply from the moment injection begins, peaks after the dwell process and then gradually declines in the cooling process.

FIG. 3 shows an example of actual measurement of a change in the mold temperature $T_m$ in a case where the molding cycle is changed from 16 seconds to 12 seconds. Since the molding cycle becomes shorter, the mold temperature $T_m$ rises overall. When the molding cycle is lengthened, the mold temperature $T_m$ declines overall. A cooling channel passes through the interior of the mold and coolant flows through the cooling channel, as mentioned above. If the molding cycle is lengthened, the mold is cooled over a longer period of time and the overall mold temperature declines.

The above-described change in mold temperature is the first factor that can be mentioned as having an effect upon the quality of the molded articles in a case where the molding cycle is changed. When a change in mold temperature occurs, this is accompanied also by a change in the state in which the molten resin is injected into the cavity of the mold, thus causing a variation in the quality of the molded articles. For example, the mold temperature declines if the molding cycle is lengthened, as mentioned above. As a result, the molten resin does not fill the interior of the mold as easily and there is a decrease in the weight and dimensions of the molded articles.

A second factor is the temperature of the molten resin injected into the cavity of the mold. For example, when the molding cycle is lengthened in a mold of hot-runner type, the resin resides in the hot runners for a longer period of time in comparison with residence time prior to the cycle change, and therefore the resin is heated for a longer time. Accordingly, the temperature of the molten resin varies nearer to the temperature to which the heaters of the runners have been set, with the resin being injected into the mold cavity at near the set temperature. As a result, there is a variation in the state in which the resin is injected into the cavity (a variation of the state in which the cavity is filled with the resin). This brings about a fluctuation in the quality of the molded articles.

A third factor that can be mentioned is the molded-article ejection temperature. If there is a change in the mold temperature or in the temperature of the molten resin, naturally there will be a change also in the molded-article ejection temperature. When this occurs, the amount of shrinkage of a molded article after molding deviates from the standard, with the result that there is a fluctuation in quality in terms of dimensions and warpage.

A variation in mold temperature and in molded-article ejection temperature is a cause also of a fluctuation in molded-article quality in the case of items (ii) and (iii) mentioned above. Furthermore, the change in the temperature of the molten resin is a cause also of a fluctuation in molded-article quality in the case of item (iii) mentioned above.

SUMMARY OF THE INVENTION

Accordingly, an object of the present invention is to suppress a fluctuation in the quality of molded articles and minimize the occurrence of defective molded articles, even in the case of items (i), (ii), (iii) above, by arranging it so that at least one of mold temperature, molten resin temperature and molded-article ejection temperature will be held at a predetermined value (a standard value) or will reach this value as quickly as possible.

According to a first aspect of the present invention, the foregoing object is attained by providing an injection molding control method for controlling the temperature of an injection mold when injection molding is performed using the mold. The mold has mold cooling channels arranged around a cavity and a temperature adjusting portion for adjusting the temperature of a molten resin arranged in a passageway leading from an injection molding machine to the cavity. The method comprises a step of measuring characteristic quantities of mold temperature in a molding cycle. A step of measuring coolant temperature of the cooling channels. A step of measuring the temperature of the molten resin maintained in the temperature adjusting portion. A step of identifying a response model of a variation in mold temperature using measured values obtained at the above-mentioned measurement steps. A step of determining whether there is a cause of fluctuation in mold temperature at the start of injection. A step of calculating a target value of coolant temperature, which is for holding the mold temperature constant at the start of injection, using the response model in a case where there is a cause of fluctuation in mold temperature. And, a step of controlling temperature or flow rate of the coolant in such a manner that the temperature of the coolant in the cooling channels will attain the calculated target value.

The determination as to whether there is a cause of fluctuation in mold temperature includes a determination as to whether or not the molding cycle has been changed and a determination as to whether or not a deviation in mold temperature, which has been measured at the start of injection, with respect to a standard mold temperature is greater than a predetermined value.

According to a first aspect of the present invention, the foregoing object is attained by providing an injection molding control apparatus for controlling the temperature of an injection mold when injection molding is performed using the mold. The mold has mold cooling channels arranged around a cavity and a temperature adjusting portion for adjusting the temperature of a molten resin is arranged in a passageway leading from an injection molding machine to the cavity. The apparatus comprises a first measuring means for measuring characteristic quantities of mold temperature in a molding cycle. A second measuring means for measuring coolant temperature of the cooling channels. A third measuring means for measuring the temperature of the molten resin maintained in the temperature adjusting portion. A means for identifying a response model of a variation in mold temperature using measured values obtained by the first, second and third measuring means. A means for determining whether there is a cause of fluctuation in mold temperature at the start of injection. A means for calculating a target value of coolant temperature, which is for holding the mold temperature constant at the start of injection, using the response model in a case where there is a cause of fluctuation in mold temperature. And a means for controlling temperature or flow rate of the coolant in such a manner that the temperature of the coolant in the cooling channel will attain the calculated target value.

Control according to the first aspect of the present invention involves control for holding the mold temperature constant. This is carried out in a case where there is a change in the molding cycle and in a case where a deviation occurs between the actual mold temperature at the start of injection and a standard mold temperature (at the start of injection). The temperature of the mold coolant is controlled in such a manner that the mold temperature at the start of injection will always become equal to the standard mold temperature. Control according to the first aspect of the invention is applicable also in order to make the mold temperature at the start of injection approach the standard mold temperature as quickly as possible when the injection molding machine is started up.

In accordance with the first aspect of the present invention, the temperature of the mold at the start of injection is held constant at all times, and therefore the cavity is filled with the molten resin in the same way at all times. As a result, the weight and dimensions of the molded articles are kept uniform at all times.

According to the first aspect of the present invention, there is also provided a method of estimating what the mold temperature will be in the future. More specifically, in injection molding using an injection mold having mold cooling channels arranged around a cavity, in which a molten resin is adjusted in temperature in a temperature adjusting portion provided in a passage leading from an injection molding machine to the cavity, there is provided a method comprising the following steps. A step of measuring characteristic quantities of mold temperature in a molding cycle. A step of measuring coolant temperature of the cooling channels. A step of measuring the temperature of the molten resin maintained in the temperature adjusting portion. A step of identifying a response model of a variation in mold temperature using measured values obtained at the above-mentioned measurement steps. And, a step of estimating what the mold temperature will be in the future using the response model.

According to the first aspect of the invention, this method further includes a step of calculating a target value of coolant temperature, which is for holding the mold temperature constant at the start of injection, using the response model in a case where there is a cause of fluctuation in mold temperature at the start of injection.

The foregoing methods can be effectively utilized in order to control mold temperature so as to attain a constant value.

According to a second aspect of the present invention, the foregoing object is attained by providing an injection molding control method in injection molding. A temperature adjusting portion for adjusting the temperature of a molten resin is arranged in a passageway leading from an injection molding machine to a cavity of an injection mold. The temperature adjusting portion is provided with a heater for heating the molten resin residing in the temperature adjusting portion. The control method is for controlling the temperature of the molten resin, which resides in the temperature adjusting portion, when injection molding is performed using the injection mold. The method comprises a step of measuring the temperature of the molten resin residing in the temperature adjusting portion. A step of identifying a response model of a variation in molten resin temperature in the temperature adjusting portion using the measured temperature of the molten resin and a target temperature of the molten resin to be heated by the heater. A step of determining whether there is a cause of fluctuation in molten resin temperature in the temperature adjusting portion. A step of calculating a new target temperature of heating performed by the heater, in order to hold constant the molten resin temperature in the temperature adjusting portion, using the response model in a case where there is a cause of fluctuation in molten resin temperature. A step of controlling the molten resin temperature in the temperature adjusting portion in such a manner that the molten resin temperature will attain the new target temperature.

The determination as to whether there is a cause of fluctuation in molten resin temperature includes a determination as to whether or not the molding cycle has been changed and a determination as to whether or not a deviation in measured molten resin temperature with respect to a standard molten resin temperature is greater than a predetermined value.

According to a second aspect of the present invention, the foregoing object is attained by providing an injection molding control apparatus in an injection mold. A temperature adjusting portion for adjusting the temperature of a molten resin is arranged in a passageway leading from an injection molding machine to a cavity of the mold. The temperature adjusting portion being provided with a heater for heating the molten resin residing in the temperature adjusting portion. The control apparatus is for controlling the temperature of the molten resin, which resides in the temperature adjusting portion, when injection molding is performed using the injection mold. The apparatus comprising means for measuring the temperature of the molten resin residing in the temperature adjusting portion. Means for identifying a response model of a variation in molten resin temperature in the temperature adjusting portion using the measured temperature of the molten resin and a target temperature of the molten resin to be heated by the heaters. Means for determining whether there is a cause of fluctuation in molten resin temperature in the temperature adjusting portion. Means for calculating a new target temperature of heating performed by the heater, in order to hold constant the molten resin temperature in the temperature adjusting portion, using the response model in a case where there is a cause of fluctuation in molten resin temperature. And, means for controlling the molten resin temperature in the temperature adjusting portion in such a manner that the molten resin temperature will attain the new target temperature.

Control according to the second aspect of the present invention involves control for holding the molten resin temperature constant. This is carried out in a case where there is a change in the molding cycle and in a case where a deviation occurs between the actual resin temperature in a hot runner and a standard resin temperature (both of which are temperatures which prevail immediately prior to the start of the molding cycle, for example). The set target temperature of the hot-runner heater is adjusted in such a manner that the actual resin temperature will become equal to the standard resin temperature at all times. This control is applicable also in order to make the resin temperature approach the standard resin temperature as quickly as possible when the injection molding machine is started up.

In accordance with the second aspect of the invention, the temperature of the molten resin in the hot runner is held constant at all times. And, therefore so is the state in which the resin is injected into the mold cavity. As a result, a fluctuation in the quality of the molded articles is suppressed.

According to the second aspect of the present invention, there is also provided a method of estimating what resin temperature will be in the future. More specifically, there is provided a method comprising a step of arranging a temperature adjusting portion for adjusting the temperature of a molten resin in a passageway leading from an injection molding machine to a cavity of an injection mold, and a heater for heating the molten resin residing in the temperature adjusting portion. A step of measuring the temperature of the molten resin held in the temperature adjusting portion. A step of identifying a response model of a variation in molten resin temperature in the temperature adjusting portion using the measured temperature of the molten resin and a target temperature of the molten resin to be heated by the heater. And a step of estimating what the resin temperature will be in the future using the response model.

According to the second aspect of the invention, this method further includes a step of calculating a new target temperature of heating performed by the heater, in order to hold constant the molten resin temperature in the temperature adjusting portion, using the response model in a case where there is a cause of fluctuation in molten temperature in the temperature adjusting portion.

The foregoing methods can be effectively utilized in order to control molten resin temperature so as to attain a constant value.

According to a third aspect of the present invention, the foregoing object is attained by providing an injection molding control method in injection molding in which a molten resin is injected into a mold and a molded article is ejected from the mold upon elapse of a fixed cooling time following the start of injection. The control method is for controlling ejection temperature of the molded article to be ejected from the mold. The method comprising a step of measuring mold temperature in a molding cycle. A step of calculating a mean value of mold temperature in a period of time from start of injection until expiration of cooling time. A step of measuring the temperature of the resin supplied to the mold. A step of identifying a response model of a variation in molded-article ejection temperature using the calculated mean mold temperature and the measured molten resin temperature. A step of calculating a new cooling time, at which a molded article having a molded-article target ejection temperature is to be ejected, using the response model when the molding cycle is changed. And a step of setting the new cooling time as the cooling time.

According to a third aspect of the present invention, the foregoing object is attained by providing an injection molding control apparatus in injection molding in which a molten resin is injected into a mold and a molded article is ejected from the mold upon elapse of a fixed cooling time following the start of injection. The control apparatus is for controlling ejection temperature of the molded article to be ejected from the mold. The apparatus comprises a first measuring means for measuring mold temperature in a molding cycle. Means for calculating a mean value of mold temperature in a period of time from start of injection until expiration of cooling time. A second measuring means for measuring the temperature of the resin supplied to the mold. A means for identifying a response model of a variation in molded-article ejection temperature using the calculated mean mold temperature, and the measured molten resin temperature, a means for calculating a new cooling time, at which a molded article having a molded-article target ejection temperature is to be ejected, using the response model when the molding cycle is changed. And, a means for setting the new cooling time as the cooling time.

Control according to the third aspect of the present invention involves control for holding the molded article ejection temperature constant. This is executed only in a case where there is a change in the molding cycle. Cooling time (injection-process time+dwell-process time+cooling-process time) is controlled in such a manner that the ejection temperature of a molded article (the temperature of the molded article at the instant it is ejected) will be maintained at a constant standard ejection temperature at all times irrespective of a change in the molding cycle. The molded-article extraction temperature which prevails when the molded article is ejected from the mold is maintained to be the same as a molded-article ejection temperature in a standard state, which is that in which results for best quality are obtained. This makes it possible to preclude a fluctuation in quality, such as a fluctuation in the dimensions of the molded article and the occurrence of warpage.

According to the third aspect of the present invention, there is also provided a method of estimating what molded-article ejection temperature will be in the future. More specifically, in injection molding in which a molten resin is injected into a mold and a molded article is ejected from the mold upon elapse of a fixed cooling time following the start of injection, there is provided a method which comprises a step of measuring mold temperature in a molding cycle. A step of calculating a mean value of mold temperature in a period of time from start of injection until expiration of cooling time. A step of measuring the temperature of the resin supplied to the mold. A step of identifying a response model of a variation in molded-article ejection temperature using the calculated mean mold temperature and the measured molten resin temperature. And a step of estimating what ejection temperature will be in the future using the response model.

According to the third aspect of the invention, this method further includes a step of calculating a new cooling time, at which a molded article having a molded-article target ejection temperature is to be ejected, using the response model when the molding cycle is changed.

The foregoing methods can be effectively utilized in order to control ejection temperature so as to attain a constant value.

In the present invention, the scope of the temperature adjusting portion covers the hot runner portion in a hot-runner-type mold, the hot runner portion in a mold of the semi-hot-runner type, and the barrel portion in a molding machine using a cold-runner-type mold.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a table showing the results of comparison between a case in which mold temperature is controlled to be a constant value at the time of a change in molding cycle, and a case in which this control is not carried out;

DESCRIPTION OF THE PREFERRED EMBODIMENT (1) Configuration of Measurement System and Control System FIG. 4 is a diagram showing the configuration of a measurement system and control system for measuring and controlling various temperatures and times associated with a mold for injection molding.

Figure 1:
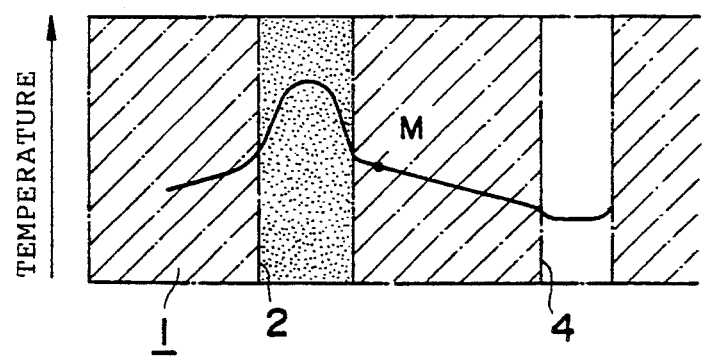
FIG. 1 illustrates the temperature distribution in a mold at a certain time, wherein a molded article is being cooled during a molding cycle.

A mold 1 is composed of two split molds 1A and 1B between which a cavity 2 is formed. The split mold 1B is formed to have a hot-runner portion (temperature adjusting portion) 3, which leads to the cavity 2. Molten resin injected from an injection molding machine (not shown) is injected into the cavity 2 through the hot-runner portion 3. Cooling channels 4 are arranged around the cavity 2. A heater 23 is provided around the hot-runner portion 3 in order to keep the molten resin in the hot-runner portion 3 warm and control the flow rate of the molten resin which flows into the cavity 2.

Temperature $T_m$ of the mold 1 is measured by a temperature sensor 11. Temperature $T_p$ of the molten resin in the mold 1 (particularly the hot-runner portion 3) is measured by a temperature sensor 13. The temperature of the coolant which flows through the cooling channels 4 are measured by a temperature sensor 14. Further, the ejection temperature of a molded article P (namely the temperature of the article at the instant it is ejected from the mold) is measured by a temperature sensor 15. These various measured temperatures are applied to a computer system 31.

The computer system 31 includes a computer body which includes an internal memory, a CPU and the like, an input unit which includes a keyboard, a mouse, etc., an output unit which includes a display device, a printer, etc., an external memory device which includes a magnetic disk, a magnetic tape and a drive mechanism therefor, and an interface for connecting the computer body to these input/output units. The computer system 31 is used in order to execute various arithmetic processing, control processing and the like, described later.

There are provided a resin-temperature control unit 33 for adjusting the temperature of the molten resin within the hot-runner portion 3, and a coolant-temperature control unit 34 for adjusting the temperature of the coolant which flows through the cooling channels 4. These temperature control units 33, 34 are provided with temperature setting units 33A, 34A, respectively. The resin-temperature control unit 33 controls the passage of current through the heater 23 in such a manner that the temperature measured by the temperature sensor 13 will become equal to the resin temperature set in the temperature setting unit 33A. The coolant-temperature control unit 34 controls one or both of the temperature and flow rate of the coolant which flows through the cooling channels 4 in such a manner that the temperature measured by the temperature sensor 14 becomes equal to the coolant temperature set in the temperature setting unit 34A. These control units 33 and 34 are realized by feedback proportional-control units or the like, which are well-known in the art.

A control unit 40 for the injection molding machine controls the operation of the injection-molding cycle in the injection molding machine. Specifically, the control unit 40 controls a hydraulic circuits which drives the screw of the injection molding machine back and forth, a motor for rotating the screw, etc. The control unit 40 is provided with an injection-process time setting unit 41 (which actually sets screw speed (injection speed), as a result of which the time of the injection process is decided), a dwell-process time setting unit 42, a cooling-process time setting unit 43, a mold opening-speed setting unit 44, and a mold closing-speed setting unit 45, etc. The times and speeds mentioned above can be set at will by these setting units. The molding cycle is changed by changing the various times and speed using these setting units 41 ~ 45. The control unit 40 for the injection molding machine also controls a mold opening/closing device 46. When the cooling-process time decided by the setting unit 43 elapses after the injection and dwell processes, the mold 1 is opened by the opening/closing device 46 under the control of the control unit 40. Thereafter, upon passage of a prescribed period of time, or in operative association with a molded-article takeout device (not shown), the opening/closing device 46 closes the mold 1 so that injection molding may be performed in the next cycle. Upon passage of a fixed waiting time following closure of the mold 1, the next molding cycle begins.

Such a system is used to execute (2) control for a constant value of mold temperature, (3) control for a constant value of molten resin temperature, and (4) control for a constant value of molded-article ejection temperature, which will be described in detail below. All of these control operations are predictive control, which relies upon use of a response model.

(2) Control for a constant value of mold temperature in a case is carried out in a case where the molding cycle is changed and where a deviation develops between the actual mold temperature at the start of injection and a standard mold temperature (at the start of injection). It is for controlling the temperature of the mold coolant in such a manner that the mold temperature at the start of injection will become equal to the standard mold temperature at all times. This control can be applied also to make the mold temperature at the start of injection approach the standard mold temperature as quickly as possible when the injection molding machine is started up.

(3) Control for a constant value of molten resin temperature in a case is carried out where the molding cycle is changed and where a deviation develops between the actual resin temperature in the hot-runner portion 3 and a standard resin temperature (both of which are temperatures which prevail immediately prior to the start of the molding cycle). It is for adjusting a set target temperature of the heater 23 of the hot-runner portion 3 in such a manner that the actual resin temperature will become equal to the standard resin temperature at all times. This control can be applied in order to make the resin temperature approach the standard resin temperature as quickly as possible when the injection molding machine is started up.

(4) Control for a constant value of molded-article ejection temperature which is carried out only where the molding cycle is changed. It is for controlling the cooling time (injection-process time +dwell-process time+cooling-process time) in such a manner that the ejection temperature of a molded article (the temperature of the molded article at the instant it is ejected) will be maintained at a constant standard ejection temperature at all times irrespective of a change in the molding cycle.

A trial run of injection molding is performed while changing various parameters (molding conditions) in the injection molding machine. The parameters which are changed include shot size, injection-process time, dwell-process time, cooling-process time, mold temperature at the start of injection and resin temperature immediately prior to the start of injection, etc. The quality dimensions, weight, warpage (degree of flatness) of the molded articles thus obtained was measured or examined to select the optimum molded article. The molding conditions which prevail when the optimum molded article is obtained are referred to as the standard state. Accordingly, the standard mold temperature refers to the mold temperature in the standard state, the standard resin temperature refers to the resin temperature in the standard state, and the standard ejection temperature refers to the ejection temperature in the standard state.

Among these three types of constant-value control, (2) control operation for a constant value of mold temperature is the most effective in terms of suppressing a fluctuation in the quality of the molded articles. Accordingly, it will suffice even if control operation (2) alone is performed. A combination of control operations (2) and (3) is practical, and so is a combination of control operations (2) and (4). Executing a combination of control operations (2), (3) and (4) is most preferred.

It is preferred that the three types of control operations (2), (3), and (4) be executed in order. If necessary, these control operations are repeated a plurality of times.

(2) Control for Constant Value of Mold Temperature

This control is executed where the molding cycle is changed and where a deviation develops (owing, for example, to contamination of the cooling channels) between the actual mold temperature at the time of injection (namely the output of the temperature sensor 11) and the standard mold temperature. Control is executed in such a manner that the mold temperature at the start of the injection (or immediately prior thereto) will be rendered constant (i.e., made equal to the standard mold temperature at all times). By adjusting the temperature of the coolant which flows through the cooling channels 4, the mold temperature at the start of injection is made constant. Accordingly, it will suffice to find a target value (the temperature set in the setting unit 34A) for the coolant temperature.

Figure 5:
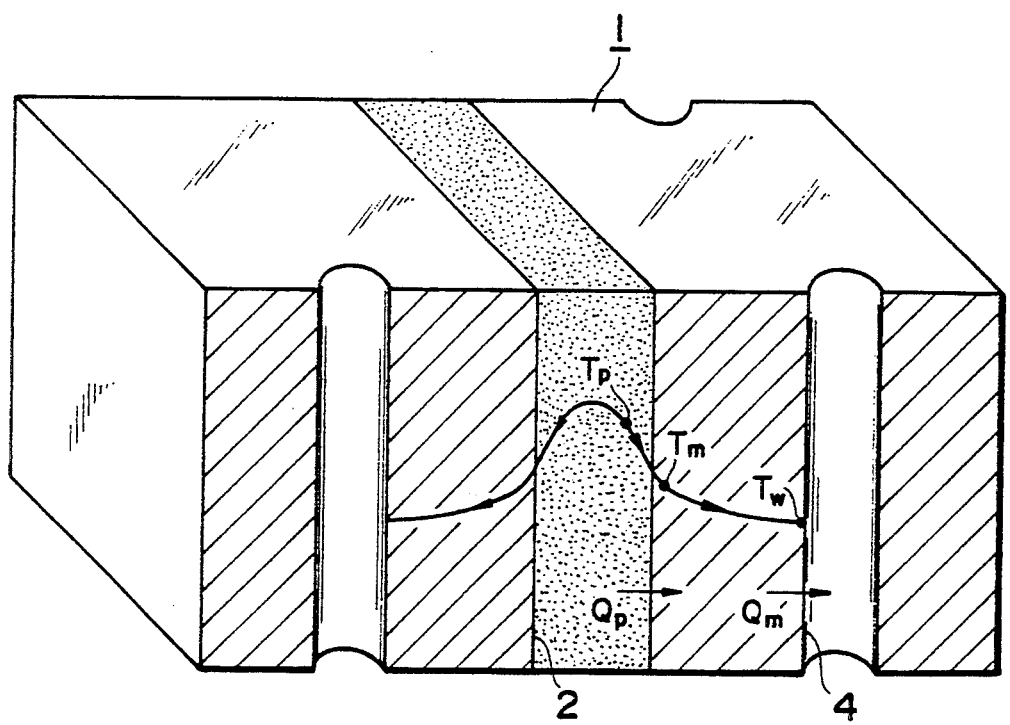
FIG. 5 is a diagram showing a response model for a system which includes a resin, a mold and water channels.

As shown in FIG. 5, a response model which involves the resin, the mold and the cooling channel will be considered for the purpose of predictive control.

The source of heat is the molten resin within the cavity 2. This heat is transmitted to the coolant within the cooling channels 4 through the mold 1.

The conduction of heat from the resin to the mold is expressed by the following equation:

$$Q_p = W_p C_p \frac{dT_p}{dt} = -h_p A_p (T_p - T_m) \quad \text{Eq. 1}$$

The conduction of heat from the mold to the coolant in the cooling channels is expressed by the following equation:

$$Q_m = W_m C_m \frac{dT_m}{dt} = h_p A_p (T_p - T_m) - h_w A_w (T_m - T_w) \quad \text{Eq. 2}$$

In the above equations, Q represents the amount of heat flow, W the mass, C the specific heat, h the heat transfer coefficient, A the cross sectional area, and T the temperature. Further, the suffix p represents the resin (the molded article), m the mold and w the coolant in the cooling channels.

If we let the following hold:

$$\frac{1}{\tau_1} = \frac{h_p A_p}{W_p C_p} \quad \text{Eq. 3}$$

$$\frac{1}{\tau_2} = \frac{h_p A_p}{W_m C_m} \quad \text{Eq. 4}$$

$$\frac{1}{\tau_3} = \frac{h_w A_w}{W_m C_m} \quad \text{Eq. 5}$$

the Eqs. 1 and 2 may be represented as indicated by the following Equations 6 and 7:

$$\frac{dT_p}{dt} = -\frac{1}{\tau_1}(T_p - T_m) \quad \text{Eq. 6}$$

$$\frac{dT_m}{dt} = \frac{1}{\tau_2}(T_p - T_m) - \frac{1}{\tau_3}(T_m - T_w) \quad \text{Eq. 7}$$

Canceling $T_p$ from Eqs. 6 and 7 gives Equation 8, as follows:

$$\frac{d^2 T_m}{dt^2} + \left(\frac{1}{\tau_1} + \frac{1}{\tau_2} + \frac{1}{\tau_3}\right)\frac{dT_m}{dt} + \frac{1}{\tau_1 \tau_3}(T_m - T_w) = 0 \quad \text{Eq. 8}$$

Eq. 8 is a basic equation regarding a mold.

By solving the foregoing basic equations (Eq. 7 or Eq. 8) under the following conditions:

$t = 0; \; T_m(t) = T_m(0)$ $t = \infty; \; T_m(t) = T_w$ and $t = 0; \; T_p(t) = T_p(0) = T_r(t_{cyc})$ $t = \infty \; T_p(t) = T_w$ the following results can be obtained with regard to the mold:

$T_m(t) = [T_m(0) - T_w] \cdot \{C_1 \exp(-n_1 t) + (1 - C_1) \exp(-n_2 t)\} + T_w$ where the following hold:

$$C_1 = \left[\frac{1}{\tau_2}(1 - \theta_{p0}) + \frac{1}{\tau_3} - n_2\right]/(n_1 - n_2) \quad \text{Eq. 10}$$

$$n_1, n_2 = -\frac{1}{2}\left(-A \pm \sqrt{A^2 - 4B}\right) \quad \text{Eq. 11}$$

$$A = \frac{1}{\tau_1} + \frac{1}{\tau_2} + \frac{1}{\tau_3} \quad \text{Eq. 12}$$

$$B = \frac{1}{\tau_1 \tau_3} \quad \text{Eq. 13}$$

$$\theta_{p0} = \frac{T_r(t_{cyc}) - T_w}{T_m(0) - T_w} \quad \text{Eq. 14}$$

(where $T_r(t_{cyc}) = T_p(0)$ holds.)

With regard to the resin (molded article), we have $$T_p(t) = [T_m(0) - T_w] \cdot \quad \text{Eq. 15}$$

Figure 7:
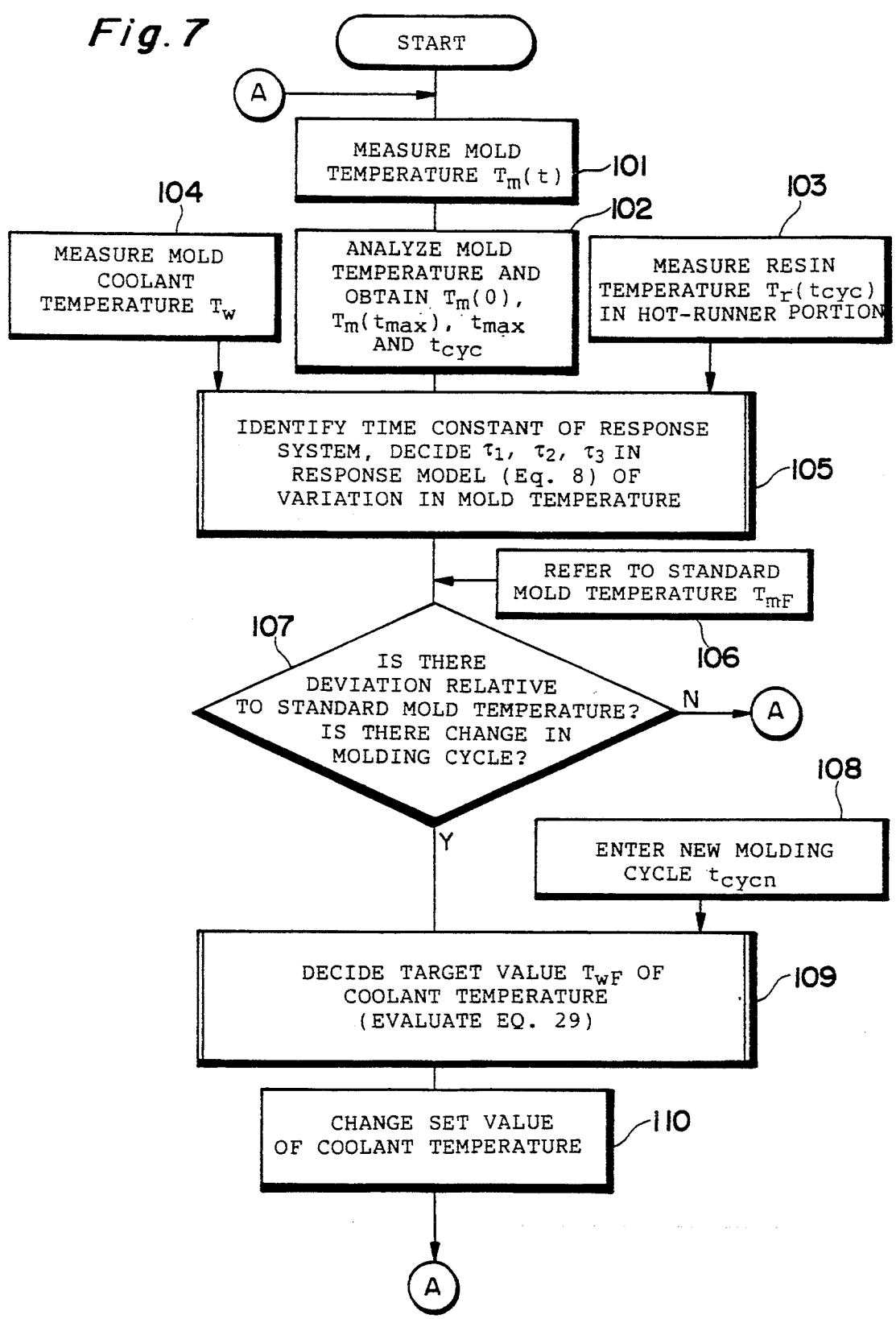
FIG. 7 is a flowchart illustrating a processing procedure for controlling mold temperature to a constant value.

$[-\tau_2\{C_1 n_1 \exp(-n_1 t) + (1 - C_1) n_2 \exp(-n_2 t)\} +$ $\left(1 + \frac{\tau_2}{\tau_3}\right)\{C_1 \exp(-n_1 t) + (1 - C_1) \exp(-n_2 t)\}] + T_w$ FIG. 7 illustrates a processing procedure for controlling the temperature of the coolant in such a manner that the mold temperature at the start of injection will be rendered constant. It is possible for the entirety of this processing to be executed by the computer system 31. Alternatively, some of the processing may be executed by the computer system 31 and a technician may intervene when necessary.

First, the mold temperature $T_m(t)$ is measured (step 101). The measurement of mold temperature $T_m(t)$ is carried out over at least one molding cycle. The output signal of the mold temperature sensor 11 is sampled every prescribed sampling period, converted into digital data and then applied to the computer system 31.

The measured mold temperature $T_m(t)$ is subjected to analysis and characteristic quantities thereof is calculated or detected (step 102).

Figure 6:
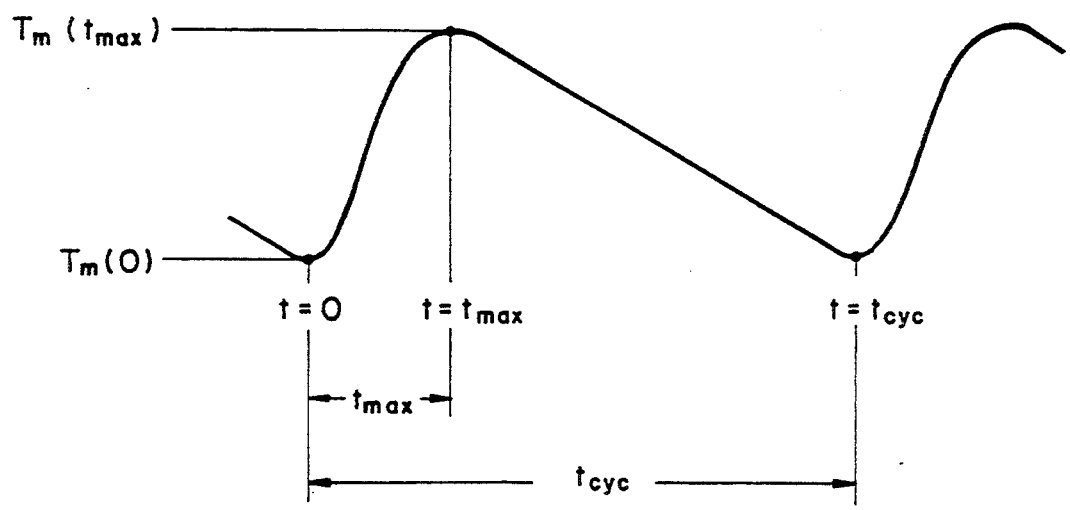
FIG. 6 is a graph showing the parameters of mold temperature.

FIG. 6 illustrates an example of the mold temperature $T_m(t)$ obtained. The characteristic quantities of the mold temperature $T_m(t)$ are mold temperature $T_m(0)$ at the start of injection, maximum mold temperature $T_m(t_{max})$, a time $t_{max}$ for the mold temperature to obtain the maximum value (time measured with the injection starting time, i.e., $t=0$, serving as a reference), and the molding cycle $t_{cyc}$.

Such characteristic quantities can be detected by program control in the computer system 31. The mold temperature $T_m(0)$ at the start of injection is the minimum value of mold temperature $T_m$. A processing algorithm for sensing the minimum value $T_m(0)$ and maximum value $T_m(t_{max})$ is well known. The time $t_{max}$ is that required for the maximum value $T_m(t_{max})$ to be obtained. Since the molding cycle $t_{cyc}$ is the time between two adjacent minimum values $T_m(0)$, this time can be found with ease. Of course, an arrangement may be adopted in which a waveform of the kind shown in FIG. 6 is outputted to the printer contained by the computer system 31. This will allow a technician to read the characteristic quantities from the waveform after it has been printed out. The values in any one cycle or average values over a plurality of cycles may be employed as such characteristic quantities.

The resin temperature $T_r(t_{cyc})$ in the hot-runner portion 3 immediately prior to the start of injection (or at the moment the molding cycle ends) and the coolant temperature $T_w$ are measured based upon the output signals from the temperature sensors 13 and 14, respectively (steps 103, 104). These measured values are applied to the computer system 31.

The parameters $\tau_1$, $\tau_2$, $\tau_3$ in the response model of temperature change in the mold represented by Eq. 8 are calculated (step 105) .

Eq. 8 is a differential equation of second order, the solutions of which are represented by Eqs. 9~14, as mentioned above.

In Eq. 9, $C_1$, $n_1$, $n_2$ are decided so as to meet the following three conditions:

(a) $T_m(t) = T_m(t_{cyc}) = T_m(0)$      Eq. 16
  when $t = t_{cyc}$ holds;
(b) $T_m(t) = T_m(t_{max})$      Eq. 17
  when $t = t_{max}$ holds; and (c) $\dfrac{\partial T_m(t)}{\partial t} = 0$      Eq. 18
  when $t = t_{max}$ holds.

Next, $\tau_1$, $\tau_2$, $\tau_3$ are obtained based upon $C_1$, $n_1$, $n_2$.
The following equations are obtained based upon Eqs. 10~13:

$$\tau_3 = \tfrac{1}{2}(\sqrt{\alpha^2 - 4\beta} - \alpha) \quad \text{Eq. 19}$$

-continued $$\tau_1 = \frac{1}{(n_1 n_2)\tau_3} \quad \text{Eq. 20}$$

$$\tau_2 = 1/\left[(n_1 + n_2) - \frac{1}{\tau_1} - \frac{1}{\tau_3}\right] \quad \text{Eq. 21}$$

where the following hold:

$$\alpha = -\frac{1}{n_1 n_2}\left(n_1 + n_2 - \frac{n_3}{\theta_{p0} - 1}\right) \quad \text{Eq. 22}$$

$$\beta = \frac{1}{n_1 n_2}\left(1 + \frac{1}{\theta_{p0} - 1}\right) \quad \text{Eq. 23}$$

$$n_3 = C_1(n_2 - n_1) - n_2 \quad \text{Eq. 24}$$

These arithmetic operations preferably are executed by the computer system 31. In a case where the aforesaid characteristic quantities have been found by a technician, the values would be inputted to the computer system 31. Of course, the arithmetic operations for the foregoing solutions may be performed by the technician.

The measurements and arithmetic operations of steps 101~105 are performed in advance when the apparatus is running in the standard state.

The standard mold temperature $T_{mF}$ is referred to at step 106. It goes without saying that the standard mold temperature is the standard mold temperature at the start of injection.

The mold temperature $T_m(0)$ at the start of injection is measured again at any desired time. It is determined whether there is a difference between this measured mold temperature $T_m(0)$ at the start of injection and the standard mold temperature $T_{mF}$. Alternatively, it is determined whether there has been a change in the molding cycle (step 107).

Predictive control is judged to be necessary if the difference between $T_m(0)$ and $T_{mF}$ is greater than a predetermined value. This predetermined value is dependent upon such factors as the precision required for the molded articles. For example, in case of a molded article that requires a high dimensional precision, there will be instances in which even 0.5° C. is unsatisfactory. This judgement may be made by the technician or the computer system 31. In case of a molded article that does not require precision, there will be instances in which 3° C. or more is satisfactory. In a case where the computer system 31 is made to perform the operation, the standard mold temperature $T_{mF}$ is inputted to the computer system 31 in advance.

Whether or not there is a change in the molding cycle is known in advance. Conversely speaking, when the molding cycle is about to be changed, the processing of steps 101~105 is executed before the change. In a case where the computer system 31 is made to perform automatic control, it will suffice to provide the system 31 with an input to the effect that there is a change in the molding cycle.

In either case, if predictive control is required, a target value $T_{wF}$ of coolant temperature is decided (step 109). In a case where the molding cycle is changed, a new molding cycle $t_{cycn}$, namely the molding cycle after the change, is inputted to the computer system 31 by a technician or from the control unit 40 for the injection molding machine (step 108).

The target coolant temperature $T_{wF}$ is decided as follows:

A case will be considered in which the coolant temperature has been changed from $T_w$ to $T_{wF}$ (the target temperature) in order to change the molding cycle from $t_{cyc}$ to $t_{cycn}$ and render the mold temperature $T_m(0)$ at the start of injection constant attendant upon this change. Since $\tau_1, \tau_2, \tau_3$ are considered as being constant, $n_1, n_2$ also are constant from Eqs. 11~13. Those constants that should be changed owing to the fact that $T_w$ is changed to $T_{wF}$ are $\theta_{p0}$ and $C_1$. If we let $\theta_{pon}, C_{1n}$, respectively, represent these constants after the change, the following equations will be obtained by referring to Eqs. 14 and 10:

$$\theta_{pon} = \frac{T_r(t_{cyc}) - T_{wF}}{T_{mF} - T_{wF}} \qquad \text{Eq. 25}$$

$$C_{1n} = \left[ \frac{1}{\tau_2}(1 - \theta_{pon}) + \frac{1}{\tau_3} - n_2 \right] / (n_1 - n_2) \qquad \text{Eq. 26}$$

It is required that the newly set coolant temperature $T_{wF}$ satisfy the following equation:

$$\begin{aligned}\theta_m(t_{cycn}) &= \frac{T_r(t_{cycn}) - T_{wF}}{T_{mF} - T_{wF}} \\ &= C_{1n}\exp(-n_1 t_{cycn}) + (1 - C_{1n})\exp(-n_2 t_{cycn}) \\ &= 1\end{aligned} \qquad \text{Eq. 27}$$

The following equation is obtained from Eq. 26:

$$\theta_{pon} = 1 - \tau_2\left\{ C_{1n}(n_1 - n_2) + n_2 - \frac{1}{\tau_3} \right\} \qquad \text{Eq. 28}$$

If this is substituted into Eq. 25 and the result is rearranged, the target value $T_{wF}$ of the coolant temperature will be given by the following equation:

$$T_{wF} = T_{mF} + \frac{T_r(t_{cyc}) - T_{mF}}{\tau_2(n_{3n} - 1/\tau_3)} \qquad \text{Eq. 29}$$

where the following holds:

$$n_{3n} = C_{1n}(n_1 - n_2) + n_2 \qquad \text{Eq. 30}$$

The following equation is obtained using Eq. 27:

$$n_{3n} = \frac{n_1[1 - \exp(-n_2 t_{cycn})] - n_2[1 - \exp(-n_1 t_{cycn})]}{\exp(-n_1 t_{cycn}) - \exp(-n_2 t_{cycn})} \qquad \text{Eq. 31}$$

The foregoing solution entails deciding a target value of coolant temperature in such a manner that a value of mold temperature predicted for the future will coincide with the standard mold temperature.

In a case where there is no change in molding cycle, it will suffice to make the substitution $t_{cycn} = t_{cyc}$ in Eqs. 29 and 31.

These arithmetic operations preferably are executed by the computer system 31.

By setting the coolant target temperature $T_{wF}$ thus obtained in the setting unit 34A, control is performed by the coolant-temperature control unit 34 in such a manner that the coolant temperature will become the target temperature $T_{wF}$ (step 110). The setting of the target temperature $T_{wF}$ in the setting unit 34A may be performed by the computer system 31 or by a technician.

The processing of steps 106~110 may be carried out periodically or at irregular intervals. It would be preferable to execute this processing periodically in cases where there is a possibility that the mold temperature at the start of injection will deviate from the standard mold temperature owing to contamination of the cooling channel or for some other reason. When the molding cycle is about to be changed, it will suffice for the processing to be executed immediately before the change is made on each occasion.

Figure 8:
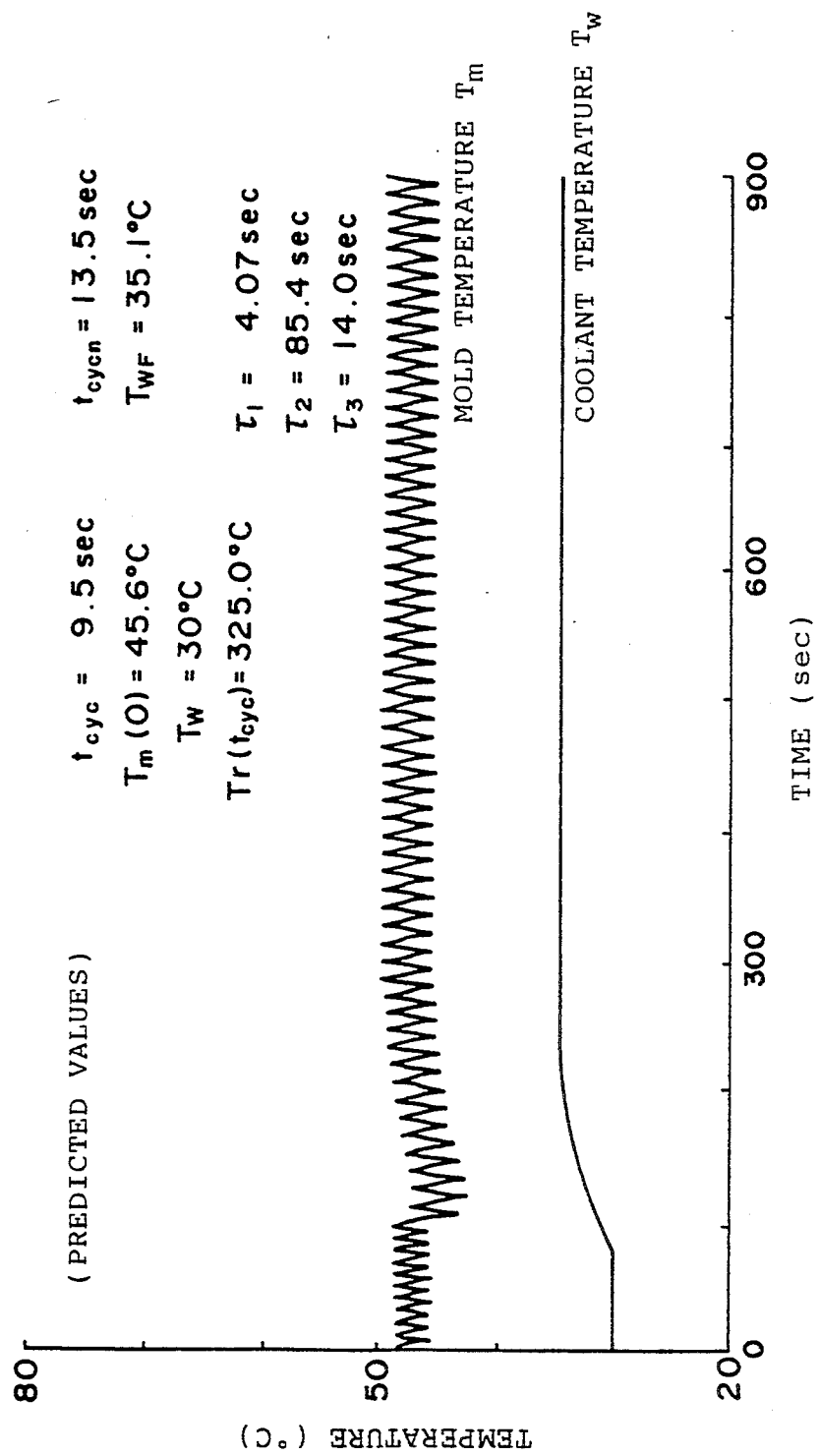
FIG. 8 is a graph showing predicted values of mold temperature and coolant temperature in a case where a molding cycle is changed.

FIG. 8 illustrates predicted values of mold temperature and coolant temperature in a case where the molding cycle has been changed.

The state which prevails prior to the change in the molding cycle is adopted as the standard state. The measured values are as follows: molding cycle $t_{cyc}=9.5$ sec; mold temperature $T_m(0)$ at the start of injection=45.6° C.; coolant temperature $T_w=30°$ C.; and resin temperature $T_r(t_{cyc})=325°$ C. A response model of a variation in mold temperature is defined in accordance with Eq. 8 using these measured values. The parameters are $\tau_1=4.07$ sec, $\tau_2=85.4$ sec and $\tau_3=14.0$ sec.

In a case where the molding cycle is slowed four seconds from $t_{cyc}=9.5$ sec so that $t_{cycn}=13.5$ sec will hold, the target value of coolant temperature obtained from Eqs. 29 and 31 will become $T_{wF}=35.1°$ C.

Figure 9:
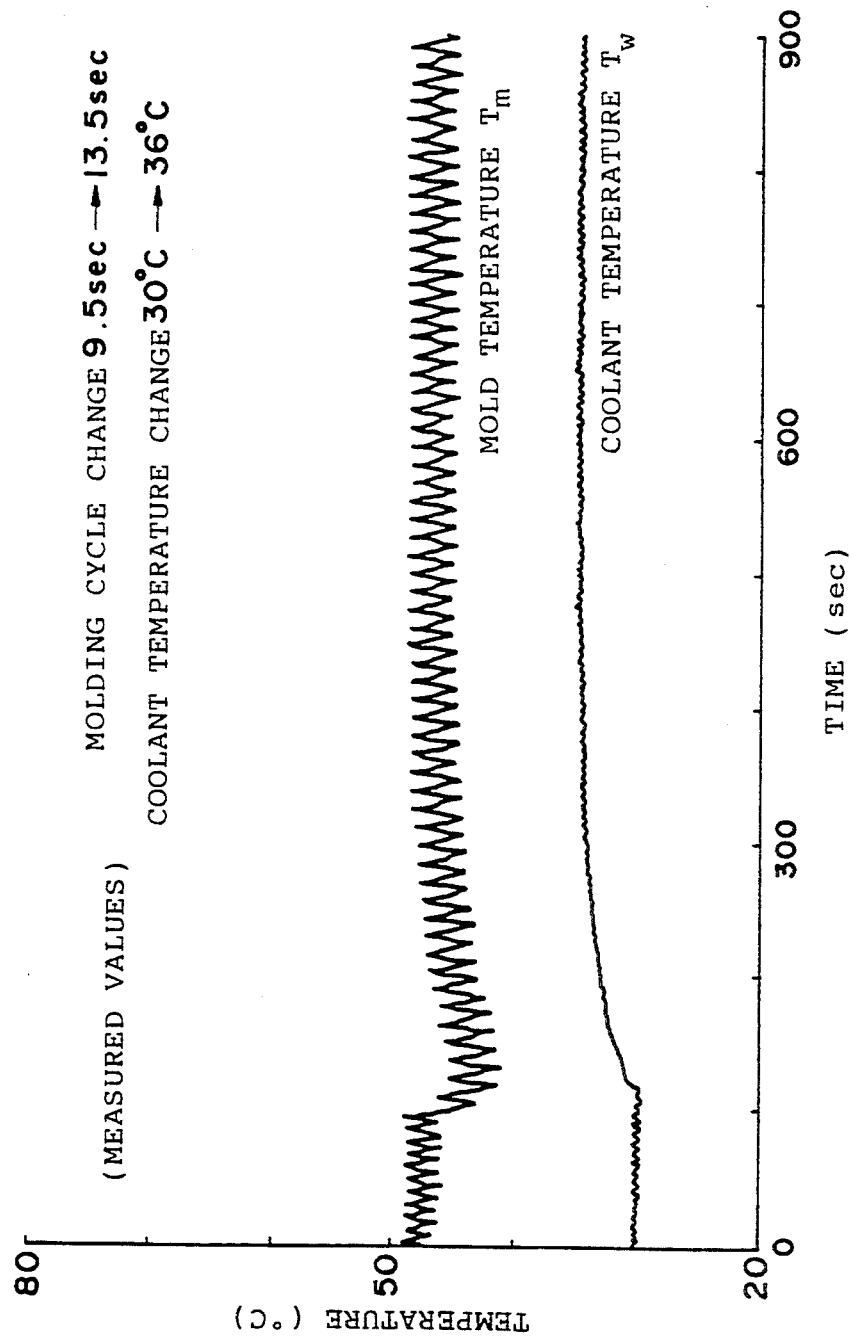
FIG. 9 is a graph showing actually measured values of mold temperature and coolant temperature in a case where a molding cycle is changed.

FIG. 9 illustrates measured values of mold temperature and coolant temperature in a case where the molding cycle was actually changed from 9.5 sec to 13.5 sec and the set value of coolant temperature was actually changed from 30° C. to 35.1° C. The actually measured value of coolant temperature was 36° C.

FIG. 10 is a table showing the results of comparison between a case (with control) in which mold temperature is controlled to be a constant value at the time of a change in molding cycle, and a case (without control) in which this control is not carried out. The results are average values of 20 sampled values.

The mold temperature 45.6° C. at the start of injection prior to the change in molding cycle (the standard state) falls to 38.3° C. without control, as opposed to 44.2° C. with control, after the change in molding cycle. A change in the weight of the molded articles is held at +0.03% with control, as opposed to +0.34% without control. A change in density is affected similarly.

Thus, by performing control for a constant value of mold temperature, it is possible to hold the variation in the quality of the molded articles to a minimum even if the molding cycle is changed.

The target value $T_{wF}$ of coolant temperature obtained as described above can be used effectively also at the time of start-up of the injection molding machine.

There are instances in which the operation of the injection molding machine is stopped periodically for maintenance. In such case, the above-described measurements and arithmetic operations are performed prior to stopping the injection molding machine in order that the target value $T_{wF}$ of coolant temperature may be obtained in advance. Owing to the halt in operation for the purpose of maintenance, there is no change in the molding cycle. There may be no deviation between the measured mold temperature $T_m(0)$ and the standard mold temperature $T_{mF}$, or the deviation may be very small. Nevertheless, obtaining the target coolant temperature $T_{wF}$ in advance is extremely effective when the injection molding machine is started up after maintenance.

Once the operation of the injection molding machine has been stopped, the mold gradually cools off. The mold temperature preferably is brought to the target temperature as quickly as possible when operation of the injection molding machine resumes, and the mold should be warmed in order to accomplish this. The coolant is used in order to warm the mold. That is, the coolant-temperature control unit 34 is set to a high temperature setting and operation of the injection molding machine is started while this high-temperature coolant (which should be referred to a warming water) is supplied to the mold. The temperature of the mold rises rapidly owing to the injected molten resin and the warming water. When the mold temperature approaches the standard mold temperature, the set temperature of the coolant-temperature control unit 34 is restored to the target coolant temperature $T_{wF}$. If operation continues for a while thereafter, the coolant can be expected to attain the target temperature $T_{wF}$ and the mold temperature also can be expected to attain the standard mold temperature $T_{mF}$.

Thus, it is possible to hasten the start-up operation of the injection molding machine.

(3) Control for Constant Value of Resin Temperature

This control is executed where the molding cycle is changed and where a deviation develops between the actual resin temperature and the standard resin temperature. Control is executed in such a manner that the actual resin temperature will be rendered constant at all times. The molten resin resides in the hot-runner portion 3 of the mold 1. If the amount of resin necessary for a single injection molding operation is in the hot-runner portion 3, the residence time of the resin in the hot-runner portion 3 is the time equivalent to one molding cycle. When the resin resides in the hot-runner portion 3, it is heated by the heater 23. Accordingly, the longer the residence time of the resin, the closer the resin temperature approaches the set temperature. Since there is a change in the residence time of the resin when there is a change in the molding cycle, the temperature of the resin also changes. Control for a constant value of molten resin temperature is performed in such a manner that the temperature of the molten resin will become equal to the standard resin temperature at all times irrespective of a change in the molding cycle and even if the molten resin temperature deviates from the standard resin temperature for some other reason. This objective is attained by adjusting the set temperature of the heater 23. Accordingly, it will suffice to determine the heater temperature setting.

A variation in the temperature of the resin in the hot-runner portion 3, in which the temperature rises with time owing to heating by the heater, can be considered to be a first-order lag in which there is no dead time. A response model of the variation in resin temperature is expressed by the equation below. This equation is premised on the fact that the resin in the hot-runner portion 3 is used in a single injection molding operation.

$$\frac{T_r(t) - T_r(0)}{T_h - T_r(0)} = 1 - \exp(-t/\tau_4) \qquad \text{Eq. 32}$$

where $T_r(0)$ represents the resin temperature immediately after the end of injection, $T_r(t)$ the resin temperature at elapse of a time t following the end of injection, $T_h$ the set value (target value) of resin temperature (namely the heater temperature setting), and $\tau_4$ is a time constant.

Figure 11:
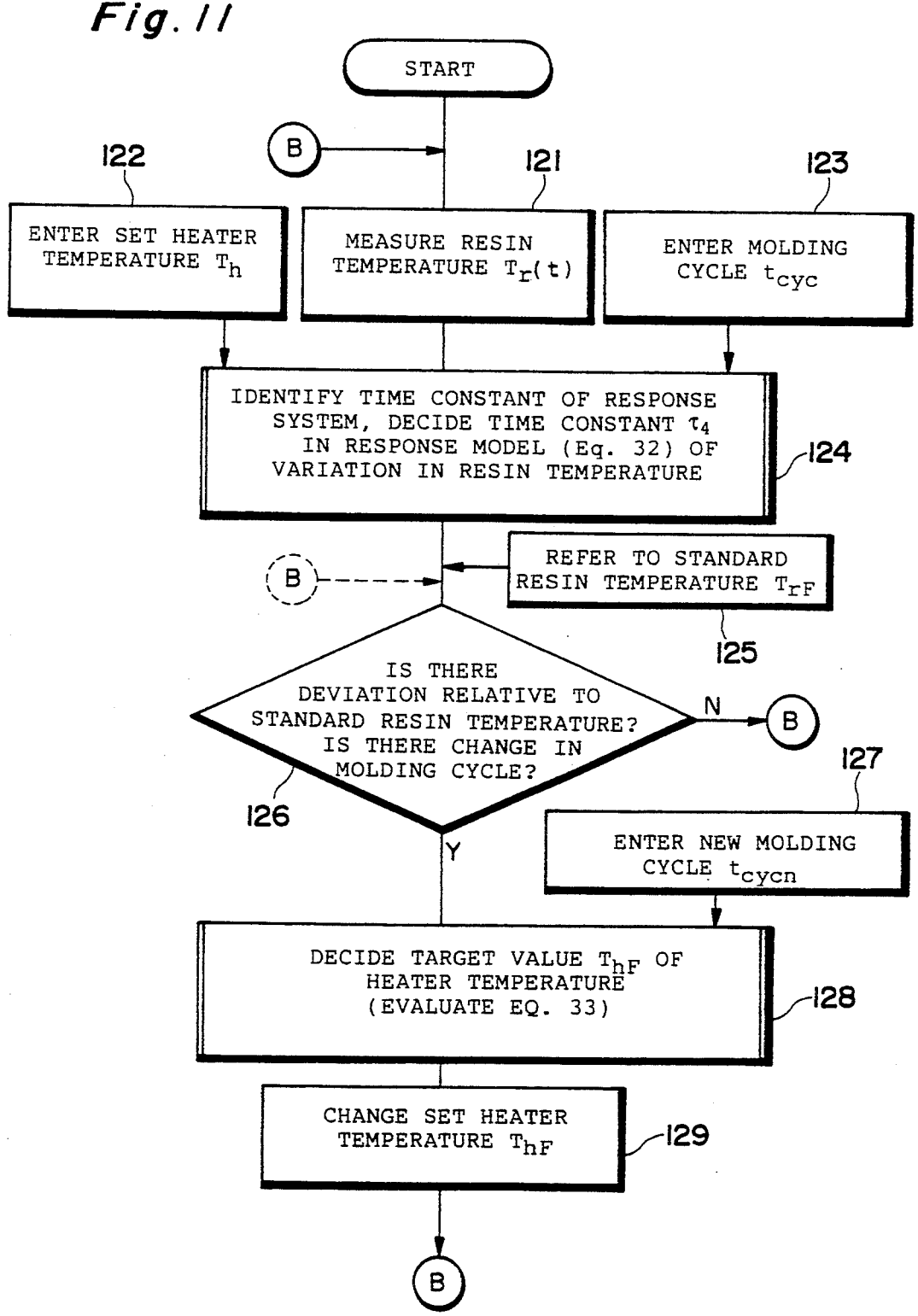
FIG. 11 is a flowchart showing the flow of processing through which molten resin temperature is controlled to be a constant value.

FIG. 11 illustrates the processing procedure for adjusting the heater temperature setting in such a manner that the resin temperature will become equal to the standard resin temperature at all times. It is possible for the entirety of this processing to be executed by the computer system 31. Alternatively, some of the processing may be executed by the computer system 31 and a technician may intervene when necessary.

First, the resin temperature $T_p(t)$ in the hot-runner portion 3 is measured by the temperature sensor 13 and applied to the computer system 31 (step 121). Also applied to the computer system 31 are a resin set temperature $T_h$, set in the temperature setting unit 33A, and a molding cycle $t_{cyc}$, set in the control unit 40 of the injection molding machine (steps 122, 123). The set temperature $T_h$ and molding cycle $t_{cyc}$ may be entered by a technician.

The resin temperature $T_r(t)$ is measured at n points in time (where n is 2 or more) within the time of one molding cycle $t_{cyc}$. The time constant $\tau_4$ is decided (step 124) by substituting the measured resin temperature $T_r(t)$ and set temperature $T_h$ into Eq. 32, which represents the response model of the variation in resin temperature. It will suffice if the time constant $\tau_4$ is decided at one time in the standard state or prior to a change in the molding cycle. This arithmetic operation would be executed by the computer system 31.

An arrangement can be adopted in which the arithmetic operation for obtaining the time constant $\tau_4$ is performed periodically and malfunction of the heater 23 is predicted from the behavior of the change in time constant $\tau_4$ with time.

Since the resin temperature varies with time within one molding cycle, the highest resin temperature $T_r(t_{cyc})$ immediately prior to the end of one molding cycle (immediately prior to the start of injection) is used in order to perform a comparison with the resin temperature in the standard state and to decide the set temperature, etc. The standard temperature immediately prior to the end of one molding cycle is used as the standard resin temperature.

The resin temperature $T_r(t_{cyc})$ is measured when resin-temperature control is to be carried out. The standard resin temperature $T_{rF}$ is referred to at step 125. The measured resin temperature $T_r(t_{cyc})$ and the standard resin temperature $T_{rF}$ are compared and it is determined whether the difference between them is greater than a predetermined value. Alternatively, it is determined whether there has been a change in the molding cycle (step 126). The predetermined value may be decided based on such factors as the precision required for the molded articles. The decision of step 126 may be made by a technician or by the computer system 31. In the latter case, the above-mentioned predetermined value and the new cycle $t_{cycn}$ would be inputted to the computer system 31 by a technician.

If there is a change in the molding cycle, the new molding cycle $t_{cycn}$ is inputted to the computer system 31 by a technician or from the control unit 40 for the injection molding machine (step 127).

Preferably, a target value of the resin temperature (the resin set temperature) $T_{hF}$ is calculated in the computer system 31 in accordance with the following equation (step 128):

$$T_{hF} = \frac{T_{rF} - T_r(0)}{1 - \exp(-t_{cycn}/\tau_4)} + T_r(0) \qquad \text{Eq. 33}$$

Eq. 33 is derived directed from Eq. 32. If there is no change in the molding cycle, it will suffice to make the substitution $t_{cycn} = t_{cyc}$ in Eq. 33. Eq. 33 means that the target value for the temperature of the heater 23 of hot-runner portion 3 is decided in such a manner that the value of resin temperature predicted for the future will agree with the standard resin temperature.

The resin set temperature $T_{hF}$ thus obtained is set in the setting unit 33A (step 129). This setting may be made by a technician or may be executed by the computer system 31.

In a case where a NO decision is rendered at step 126 or after the foregoing processing, the program returns to step 121 if necessary, so that the processing for measuring the resin temperature and deciding the time constant is executed. Since it suffices for the decision of the time constant $\tau_4$ to be made only one time in the standard state or immediately prior to the change in the molding cycle, as mentioned above, it may be arranged from processing to return to step 126 as indicated by the dashed line in FIG. 11.

The resin set temperature $T_{hF}$ obtained as set forth above can be utilized effectively at the time of start-up of the injection molding machine to hasten the start-up operation in exactly the same manner as in the case of control for a constant value of mold temperature.

(4) Control for Constant Value of Molded-Article Ejection Temperature

This control is executed only where there is a change in the molding cycle. In addition, this control is carried out after (2) control for a constant value of mold temperature and (3) control for a constant value of molten resin temperature end.

When cooling efficiency declines because of contamination of the mold cooling channel mentioned in (2) above, and at start-up of molding mentioned in (3) above, the mold temperature (at the start of injection) and the temperature of the molten resin are maintained at predetermined standard values. The molded-article ejection temperature is thus also maintained at the standard value in automatic fashion.

However, when the molding cycle is changed in (1) above, the molded-article ejection temperature will not be held at the standard value automatically even if the mold temperature and molten resin temperature are controlled so as to be maintained at the standard values.

Figure 2:
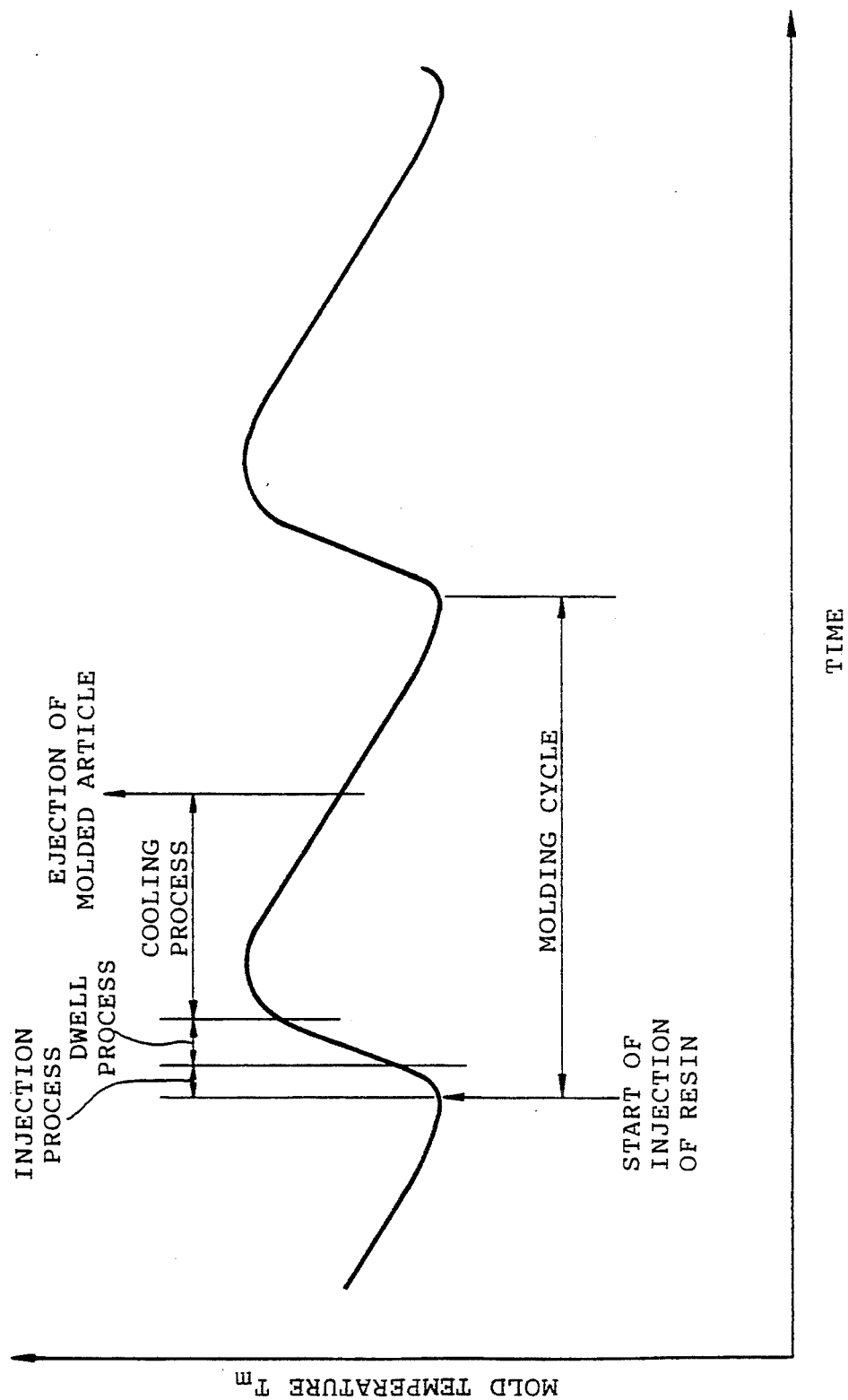
FIG. 2 is a graph showing a change in mold temperature with time in a molding cycle.
Figure 3:
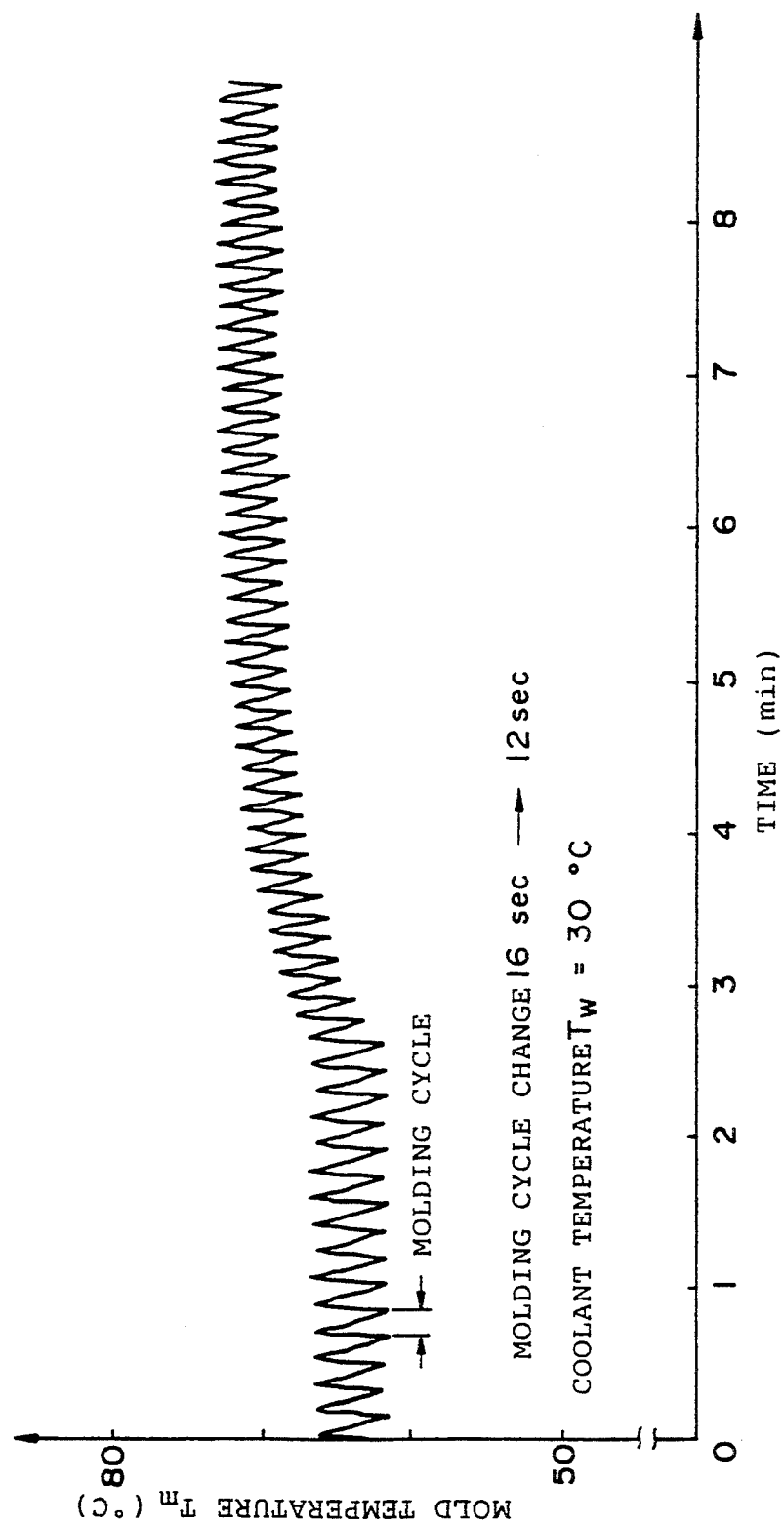
FIG. 3 is a graph showing an example of actual measurement of a variation in mold temperature in a case where a molding cycle is changed.
Figure 12:
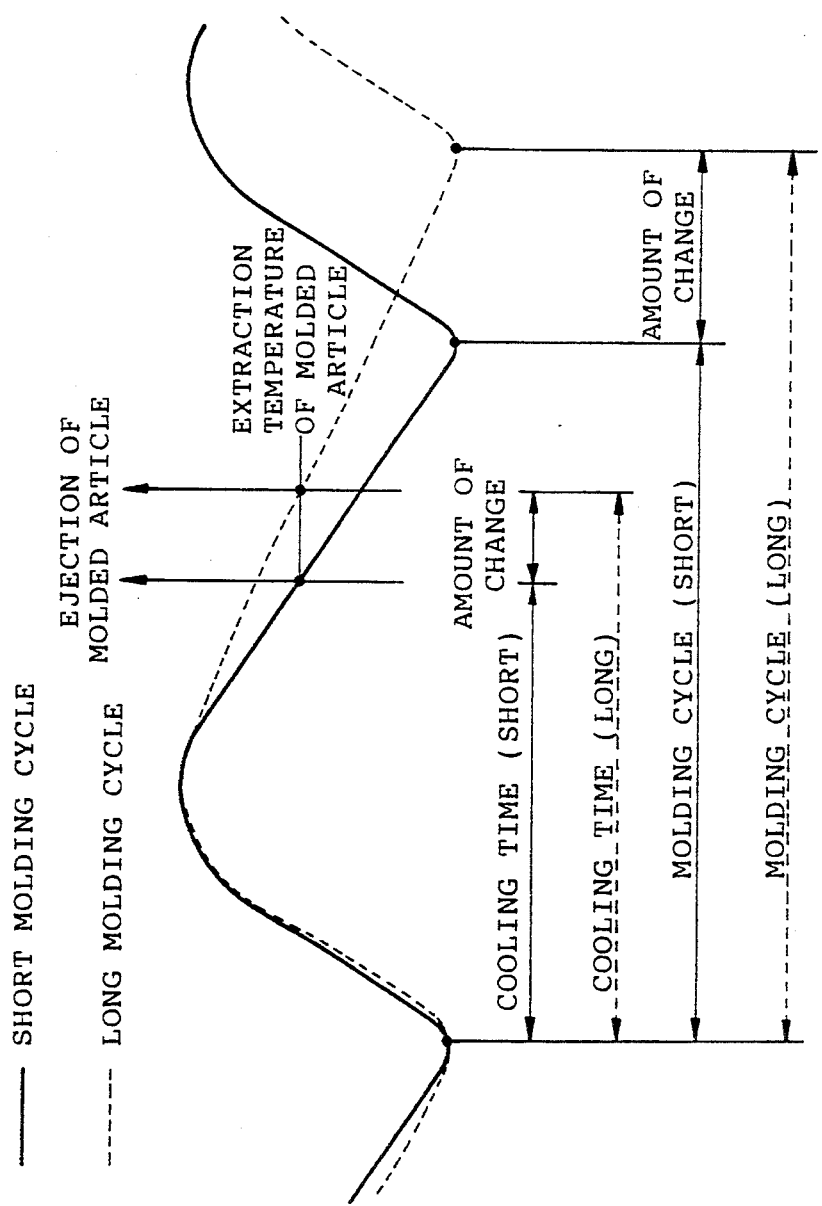
FIG. 12 is a graph showing the necessity for changing cooling time in a case where a molding cycle is changed.

FIG. 12 illustrates a variation in mold temperature in cases where the molding cycle is relatively short (as indicated by the solid line) and relatively long (as indicated by the dashed line). It will be appreciated that the mold temperature does not exhibit a constant value during the molding cycle but varies as a transition in operation is made from the injection process to the dwell process and thence to the cooling process (see FIG. 2). The pattern of the variation is repeated at the molding cycle. Accordingly, when there is a change in the molding cycle, the mold temperature also changes and the mold temperature cannot be made to conform at all points in time to the mold temperature which prevails at the time of the standard state. Accordingly, the molded-article ejection temperature will not coincide with the standard value even if the mold temperature and the molten resin temperature at the start of injection are made to conform the mold temperature and molten resin temperature in the standard state. The point in time at which the molded article is ejected must be changed in order to hold the molded-article ejection temperature constant, as illustrated in FIG. 12. That is, it is necessary to change the cooling time to hold the molded-article ejection temperature constant. The cooling time referred to here is the time from the start of injection to the ejection of the molded article.

Figure 13:
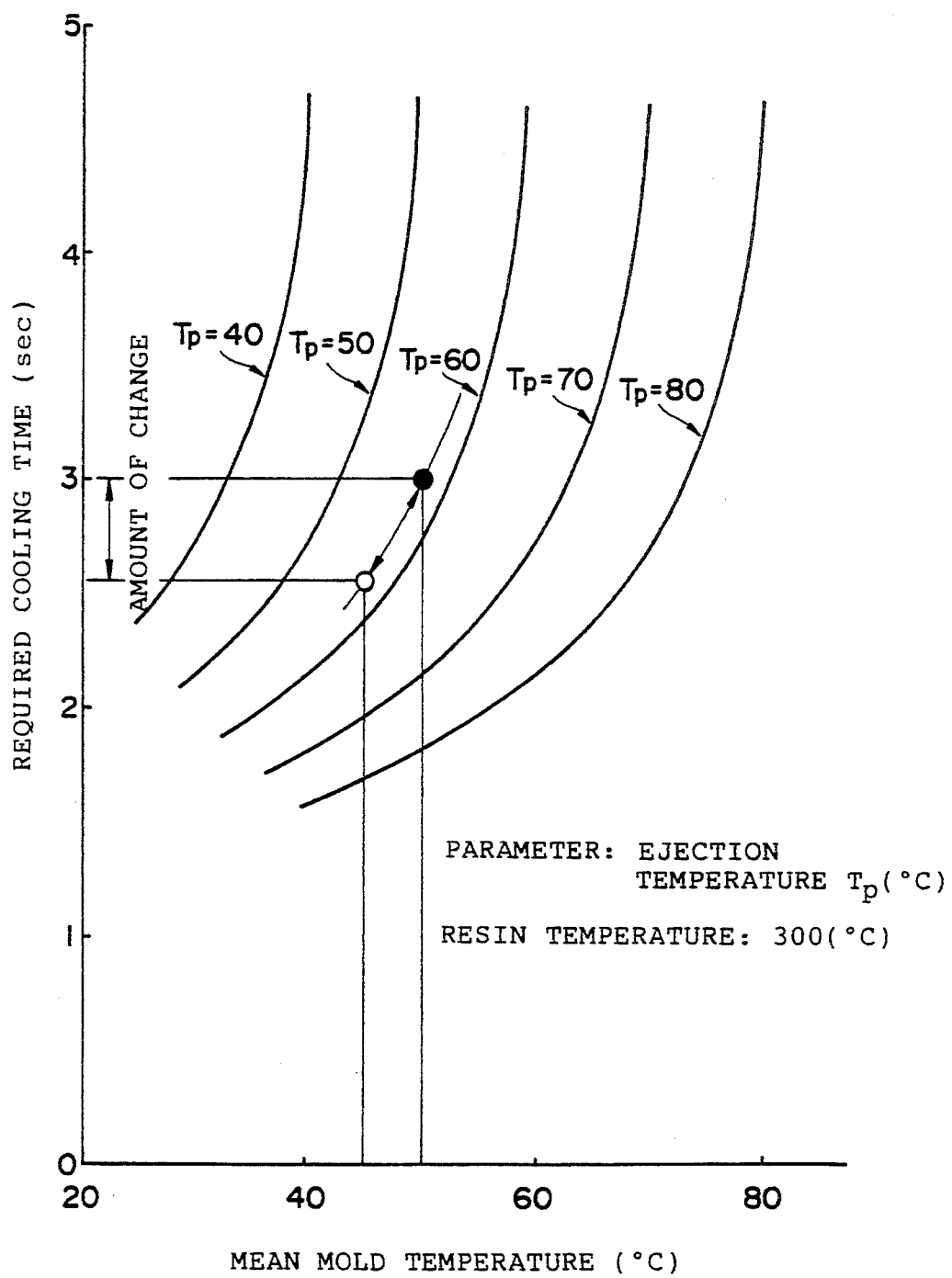
FIG. 13 is a graph showing the relationship between mold temperature and required cooling time, with molded-article ejection temperature serving as a parameter.

FIG. 13 illustrates the relationship between mean mold temperature (the mean over one molding cycle) and the required cooling time, in which molded-article ejection temperature $T_p$ serves as a parameter. The resin temperature is constant at 300° C.

When the molding cycle is changed, the mean mold temperature also changes, as will be appreciated from FIG. 12. It will be understood from FIG. 13 that it is necessary to change the required cooling time (such as by changing the time from that indicated by the black dot to that indicated by the white dot, or vice versa) in order to hold the molded-article ejection temperature $T_p$ constant when the molding cycle is changed.

The response model of the variation in molded-article ejection time also can be considered as being a first-order lag in which there is no dead time. The response model in this case is expressed by the following equation:

$$\frac{T_p(t) - {}^*T_m}{T_r(t_{cyc}) - {}^*T_m} = \exp(-t/\tau_5) \qquad \text{Eq. 34}$$

where $T_p(t)$ represents the molded-article ejection temperature, and $T_r(t_{cyc})$ the molten resin temperature immediately prior to the start of injection in the hot-runner portion 3, wherein the resin at this temperature is fed into the cavity 2 of the mold 1 in the next molding cycle. Further, ${}^*T_m$ represents the mean value of the mold temperature $T_m$ from the moment at which injection starts (t=0) to the moment the molded article is ejected (t=$t_{cool}$). In addition, $\tau_5$ represents a time constant.

Cooling time $t_{cooln}$ to be set anew when the molding cycle is changed from $t_{cyc}$ to $t_{cycn}$ is obtained as follows by solving Eq. 34:

$$t_{cooln} = -\tau_5 \ln\left(\frac{T_{pF} - {}^*T_m}{T_r(t_{cyc}) - {}^*T_m}\right) \qquad \text{Eq. 35}$$

In Eq. 35, $T_{pF}$ represents the standard molded-article ejection temperature.

Figure 14:
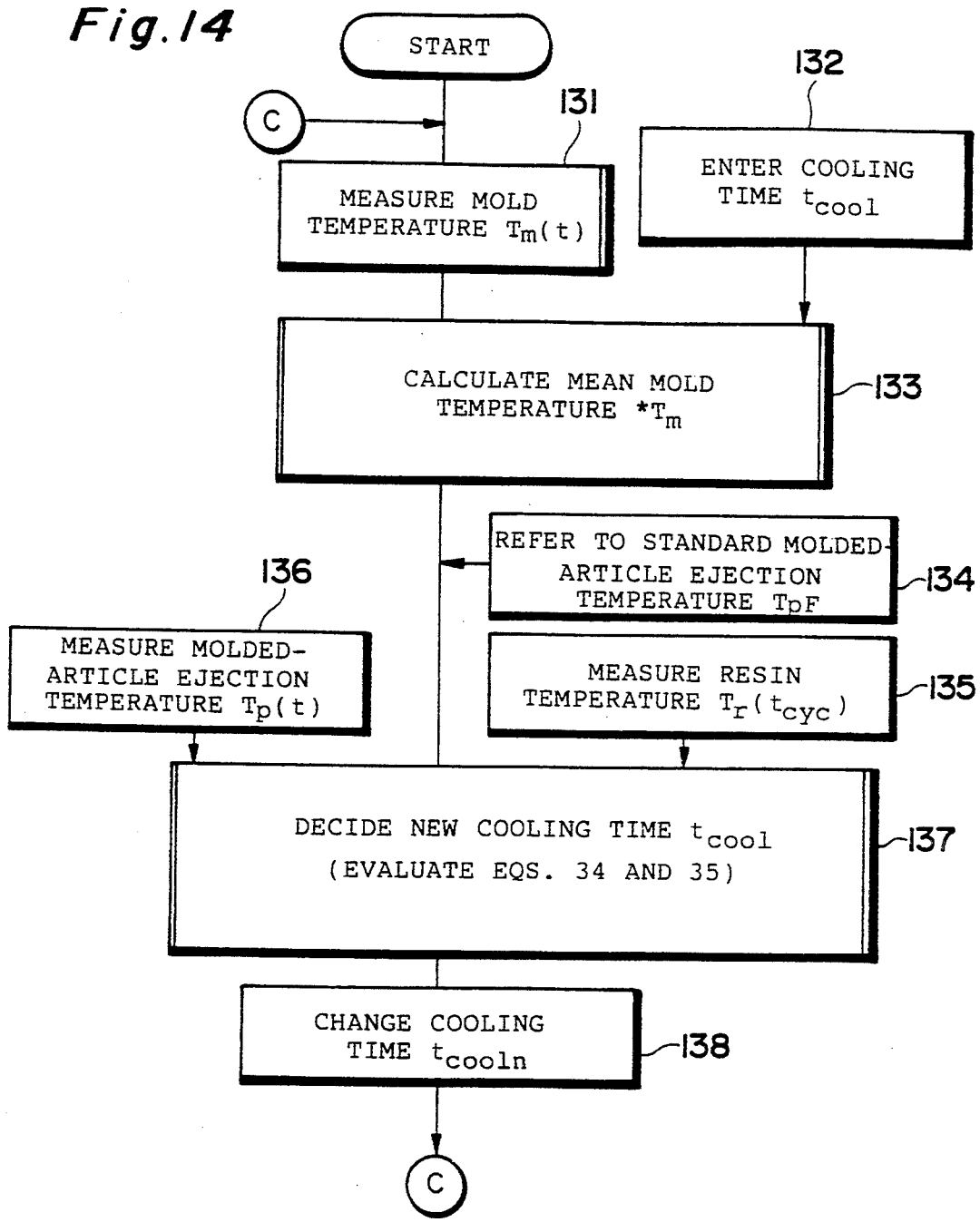
FIG. 14 is a flowchart showing the flow of processing through which ejection temperature is controlled to be a constant value.

FIG. 14 illustrates the procedure of processing for adjusting cooling time in order to perform control in such a manner that ejection temperature is rendered constant at all times. It is possible for the entirety of this processing to be executed by the computer system 31, or for some of the processing to be executed by the computer system 31, with a technician intervening when necessary.

The mold temperature $T_m(t)$ is measured by the temperature sensor 11 and applied to the computer system 31 (step 131). The measurement of mold temperature is performed over one molding cycle. The cooling time $t_{cool}$ used in the molding cycle $t_{cyc}$ prior to a change is entered (step 132). The cooling time $t_{cool}$ is obtained as the sum total of the injection-process time, dwell-process time and cooling-process time that have been set in the setting units 41, 42 and 43. This may be calculated by the computer system 31 or calculated by a technician and then inputted to the computer system 31.

By integrating measured mold temperature $T_m$ (t) from the start of injection (t=0) to the ejection of the molded article (t=$t_{cool}$) and dividing by the time $t_{cool}$, mean mold temperature *$T_m$ is calculated (step 133). This would be executed by the computer system 31.

The resin temperature $T_p(t_{cyc})$ immediately prior to the start of injection (at the end of one cycle) is measured by the temperature sensor 13 (step 135), and the temperature $T_p(t)$ of the molded article at the instant the molded article is ejected is measured by the temperature sensor (a radiation thermometer) (step 136). The time constant $\tau_5$ is calculated by substituting these items of temperature data *$T_m$, $T_r(t_{cyc})$ and $T_p(t)$ into Eq. 34.

Where it is difficult to measure the molded-article ejection temperature $T_p(t)$, the time constant $\tau_5$ may be found in advance experimentally or by trial and error and the above-described arithmetic operations may be deleted. In such case, it would be appropriate to refer to Eq. 34 as an equation for estimating the ejection temperature of the molded articles.

The standard molded-article ejection temperature is referred to at step 134. The temperature $T_{pF}$ is inputted to the computer system 31 by a technician or is set in advance. The cooling time $t_{cooln}$ to be set anew after the cycle change is calculated in accordance with Eq. 35 (step 137).

The cooling time $T_{cooln}$ thus obtained is set using any one, two or all of the setting units 41, 42, 43 (step 138). For example, the simplest method would be to set this cooling time by changing the cooling-process time using the setting unit 43. This operation preferably is carried out together with the change in the molding cycle. A difference $\Delta t = t_{cool} - t_{cooln}$ produced by changing the cooling time from $t_{cool}$ to $t_{cooln}$ would be added to the waiting time up to the start of the next molding cycle after ejection of the molded article. This change in cooling time may be executed by the computer system 31 or performed by a technician.

The foregoing processing is repeated as necessary.

(5) Other Embodiment

In the foregoing embodiment, a case has been described in which the present invention is applied to injection molding using a mold of the hot-runner type. The control for a constant value of mold temperature, control for a constant value of molten resin temperature and control for a constant value of molded-article ejection temperature can be applied also to injection molding using a mold of the semi-hot-runner type and molding using a mold of the cold-runner type.

Figure 4:
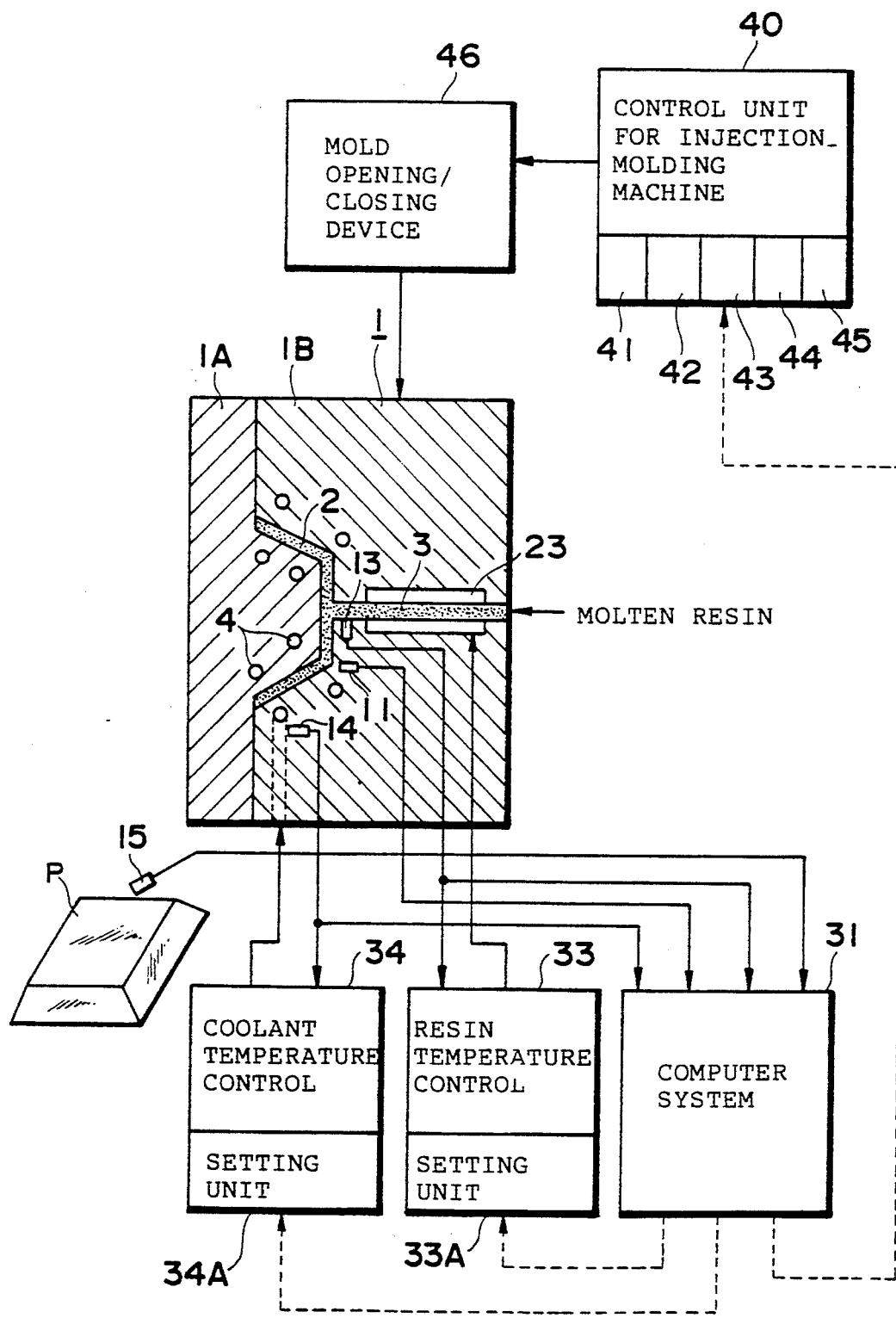
FIG. 4 is a diagram showing the arrangement of a measurement system and control system for measuring and controlling various temperatures surrounding a mold for injection molding.
Figure 15:
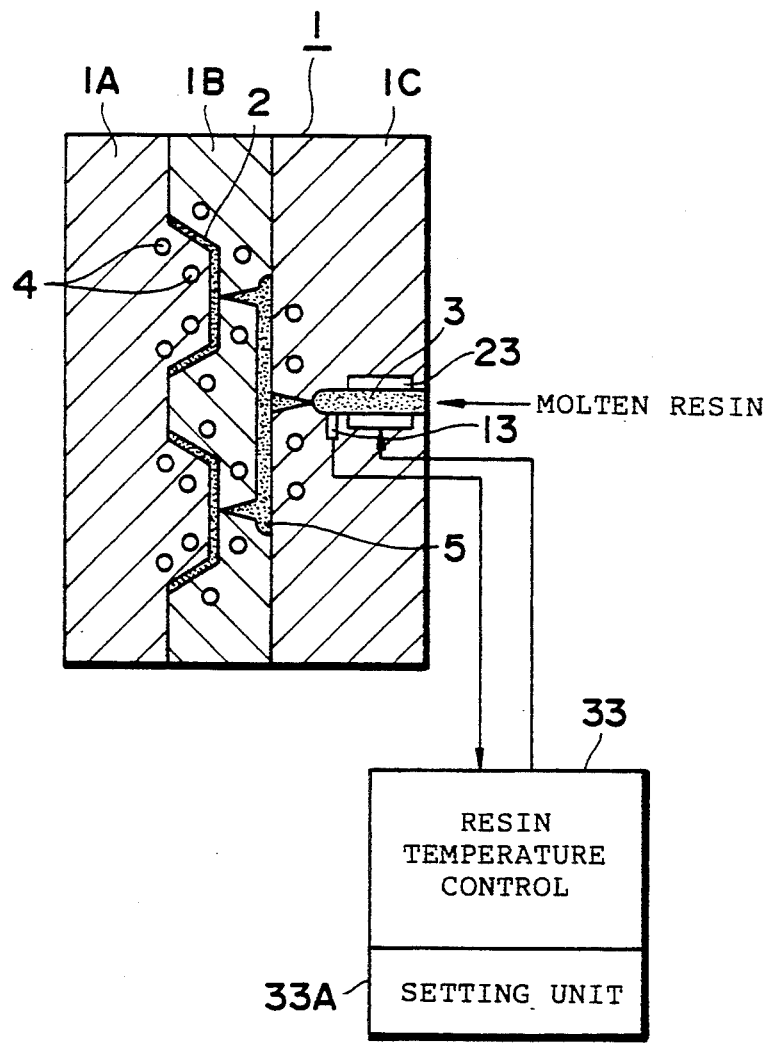
FIG. 15 shows part of an arrangement for performing injection molding using a mold of semi-hot-runner type.

FIG. 15 illustrates an example of an arrangement for injection molding using a mold of the semi-hot-runner type. Only portions which differ from those of the arrangement of the measurement system and control system shown in FIG. 4 are illustrated. Portions identical with those shown in FIG. 4 are designated by like reference characters. Here the semi-hot-runner mold 1 is composed of at least three split molds 1A, 1B and 1C. A cavity 2 is formed between the split molds 1A and 1B, a cold-runner portion 5 is formed in the split mold 1B, and a hot-runner portion 3 is formed in the split mold 1C. The hot-runner portion 3 is the temperature adjusting portion. The various types of control are carried out in exactly the same manner as in the case where the mold of the hot-runner type is employed.

Figure 16:
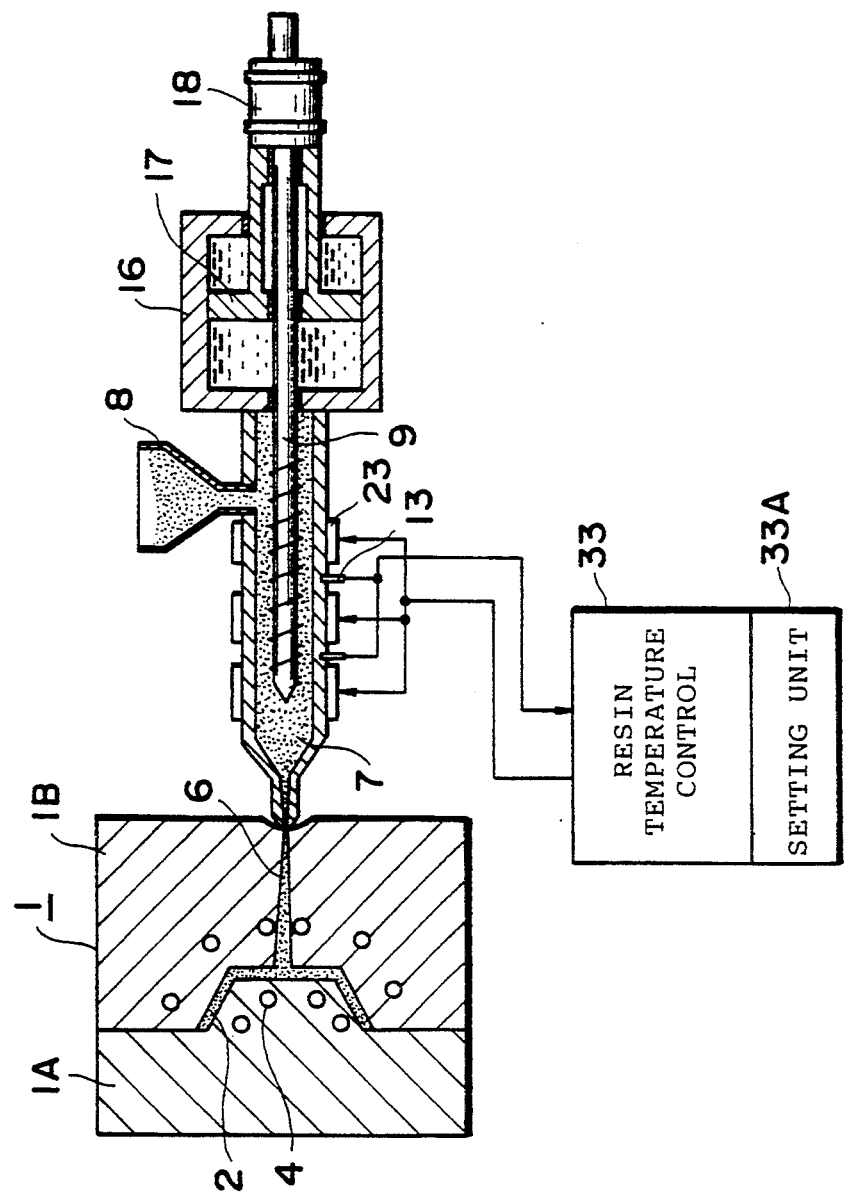
FIG. 16 shows part of an arrangement for performing injection molding using a mold of cold-runner type.

FIG. 16 illustrates an example of an arrangement for injection molding using a mold of the cold-runner type. In this diagram also, only portions which differ from those of the arrangement shown in FIG. 4 are illustrated. Portions not illustrated are identical with those shown in FIG. 4. Here the cold-runner mold 1 is formed to have a cold-runner portion 6 for feeding the molten resin into the cavity 2. The molten resin is injected from the injection molding machine. As is well known in the art, the injection molding machine comprises a barrel portion 7, a hopper 8 for supplying the barrel portion 7 with the resin material, a screw 9 which is moved back and forth while being rotated within the barrel 7, a cylinder 16 and piston 17 for urging the screw 9, and a motor 18 which rotates the screw 9. The barrel portion 7 corresponds to the temperature adjusting portion, which is provided with heaters 23 and temperature sensors 13. These are connected to the resin-temperature control unit 33. Each type of control mentioned above is carried out in exactly the same manner as in the case using the hot-runner mold except for the fact that step 103 of FIG. 7 would be changed to measurement of the resin temperature in the barrel portion.

As many apparently widely different embodiments of the present invention can be made without departing from the spirit and scope thereof, it is to be understood that the invention is not limited to the specific embodiments thereof except as defined in the appended claims.

What is claimed is:

1. An injection molding control method for controlling the temperature of an injection mold when injection molding is performed using the mold, wherein the mold has mold cooling channels arranged around a cavity and a temperature adjusting portion for adjusting the temperature of a molten resin is arranged in a passageway leading from an injection molding machine to the cavity, said method comprising the steps of:
    measuring characteristic quantities of mold temperature in a molding cycle;
    measuring coolant temperature of the cooling channels;
    measuring the temperature of the molten resin maintained in the temperature adjusting portion;
    identifying a response model of a variation in mold temperature using measured values obtained at the foregoing measurement steps;
    determining whether there is a cause of fluctuation in mold temperature at the start of injection;
    in a case where there is a cause of fluctuation in mold temperature, calculating a target value of coolant temperature, which is for holding the mold temperature constant at the start of injection, using the response model; and
    controlling temperature or flow rate of the coolant in such a manner that the temperature of the coolant in the cooling channels will attain the calculated target value.

2. The method according to claim 1, wherein the determination as to whether there is a cause of fluctuation in mold temperature includes a determination as to whether or not the molding cycle has been changed.

3. The method according to claim 1, wherein the determination as to whether there is a cause of fluctuation in mold temperature includes a determination as to whether or not a deviation in mold temperature, which has been measured at the start of injection, with respect to a standard mold temperature is greater than a predetermined value.

4. The method according to claim 1, further comprising the steps of:
- using an injection mold provided with a heater for heating the molten resin residing in the temperature adjusting portion;
- identifying a response model of a variation in resin temperature in the temperature adjusting portion using the measured molten resin temperature and a target temperature of the molten resin to be heated by the heater;
- determining whether there is a cause of fluctuation in molten resin temperature in the temperature adjusting portion;
- in a case where there is a cause of fluctuation in molten resin temperature, calculating a new target temperature of heating performed by the heater in order to hold constant the molten resin temperature in the temperature adjusting portion using the response model; and
- controlling the heater in such a manner that the molten resin temperature in the temperature adjusting portion will attain the new target temperature.

5. The method according to claim 1, further comprising the following steps in injection molding wherein a molded article is ejected from the mold upon elapse of a fixed cooling time following start of injection of the molten resin into the cavity:
- measuring mold temperature in the molding cycle;
- calculating a mean value of mold temperature in a period of time from start of injection until expiration of cooling time;
- measuring the temperature of the molten resin immediately before the molten resin is supplied to the mold;
- identifying a response model of a variation in molded-article ejection temperature using the calculated mean mold temperature and the measured molten resin temperature;
- calculating a new cooling time, at which a molded article having a molded-article target ejection temperature is to be ejected, using the response model when the molding cycle is changed; and
- setting the new cooling time as the cooling time.

6. An injection molding control method for controlling the temperature of a molten resin, which resides in a hot-runner portion of an injection mold, said hot-runner portion having a heater in the hot runner portion for heating the molten resin residing in the hot-runner portion, said method comprising the steps of:
- measuring the temperature of the molten resin residing in the hot-runner portion;
- identifying a response model of a variation in molten resin temperature in the hot-runner portion using the measured temperature of the molten resin and a target temperature of the molten resin to be heated by the heater;
- determining whether there is a cause of fluctuation in molten resin temperature in the hot-runner portion;
- in a case where there is a cause of fluctuation in molten resin temperature, calculating a new target temperature of heating performed by the heater, in order to hold constant the molten resin temperature in the hot-runner portion, using the response model; and
- controlling the molten resin temperature in the hot-runner portion in such a manner that the molten resin temperature will attain the new target temperature.

7. The method according to claim 6, wherein the determination as to whether there is a cause of fluctuation in molten resin temperature includes a determination as to whether or not the molding cycle has been changed.

8. The method according to claim 6, wherein the determination as to whether there is a cause of fluctuation in molten resin temperature includes a determination as to whether or not a deviation in measured molten resin temperature with respect to a standard resin temperature is greater than a predetermined value.

9. An injection molding control method for controlling the temperature of a molten resin, which resides in a temperature adjusting portion for adjusting the temperature of the molten resin provided in a passageway leading from an injection molding machine to a cavity of an injection mold, the temperature adjusting portion being provided with a heater for heating the molten resin residing in the temperature adjusting portion, when injection molding is performed using said injection mold, wherein a molded article is ejected from the mold upon elapse of a fixed cooling time following start of injection of the molten resin into the cavity, said method comprising the steps of:
- measuring the temperature of the molten resin residing in the temperature adjusting portion;
- identifying a response model of a variation in molten resin temperature in the temperature adjusting portion using the measured temperature of the molten resin and a target temperature of the molten resin to be heated by the heater;
- determining whether there is a cause of fluctuation in molten resin temperature in the temperature adjusting portion;
- in a case where there is a cause of fluctuation in molten resin temperature, calculating a new target temperature of heating performed by the heater, in order to hold constant the molten resin temperature in the temperature adjusting portion, using the response model;
- controlling the molten resin temperature in the temperature adjusting portion in such a manner that the molten resin temperature will attain the new target temperature;
- measuring mold temperature in the molding cycle;
- calculating a mean value of mold temperature in a period of time from start of injection until expiration of cooling time;
- measuring the temperature of the molten resin immediately before the molten resin is supplied to the mold;
- identifying a response model of a variation in molded-article ejection temperature using the calculated mean mold temperature and the measured molten resin temperature;
- calculating a new cooling time, at which a molded article having a molded-article target ejection temperature is to be extracted, using the response model when the molding cycle is changed; and
- setting the new cooling time as the cooling time.

10. An injection molding control method in injection molding in which a molten resin is injected into a mold and a molded article is ejected from the mold upon elapse of a fixed cooling time following the start of injection, wherein said control method is for controlling ejection temperature of the molded article to be ejected from the mold, said method comprising the steps of:
- measuring mold temperature in a molding cycle;

calculating a mean value of mold temperature in a period of time from start of injection until expiration of cooling time;

measuring the temperature of the resin supplied to the mold;

identifying a response model of a variation in molded-article ejection temperature using the calculated mean mold temperature and the measured molten resin temperature;

calculating a new cooling time, at which a molded article having a molded-article target ejection temperature is to be ejected, using the response model when the molding cycle is changed; and setting the new cooling time as the cooling time.

11. An injection molding control apparatus for controlling the temperature of an injection mold when injection molding is performed using the mold, wherein the mold has mold cooling channels arranged around a cavity and a temperature adjusting portion for adjusting the temperature of a molten resin is arranged in a passageway leading from an injection molding machine to the cavity, said apparatus comprising:

first measuring means for measuring characteristic quantities of mold temperature in a molding cycle;

second measuring means for measuring coolant temperature of the cooling channels;

third measuring means for measuring the temperature of the molten resin maintained in the temperature adjusting portion;

means for identifying a response model of a variation in mold temperature using measured values obtained by said first, second and third measuring means;

means for determining whether there is a cause of fluctuation in mold temperature at the start of injection;

means for calculating a target value of coolant temperature, which is for holding the mold temperature constant at the start of injection, using the response model in a case where there is a cause of fluctuation in mold temperature; and means for controlling temperature or flow rate of the coolant in such a manner that the temperature of the coolant in the cooling channels will attain the calculated target value.

12. An injection molding control apparatus in an injection mold, wherein a hot-runner portion for adjusting the temperature of a molten resin is arranged in a passageway leading from an injection molding machine to a cavity of the mold, the hot-runner portion being provided with a heater for heating the molten resin residing in the hot-runner portion, and wherein said control apparatus is for controlling the temperature of the molten resin, which resides in the hot-runner portion, when injection molding is performed using the injection mold, said apparatus comprising:

means for measuring the temperature of the molten resin residing in the hot-runner portion;

means for identifying a response model of a variation in molten resin temperature in the hot-runner portion using the measured temperature of the molten resin and a target temperature of the molten resin to be heated by the heaters;

means for determining whether there is a cause of fluctuation in molten resin temperature in the hot-runner portion;

means for calculating a new target temperature of heating performed by the heater, in order to hold constant the molten resin temperature in the hot-runner portion, using the response model in a case where there is a cause of fluctuation in molten resin temperature; and means for controlling the molten resin temperature in the hot-runner portion in such a manner that the molten resin temperature will attain the new target temperature.

13. An injection molding control apparatus in injection molding in which a molten resin is injected into a mold and a molded article is ejected from the mold upon elapse of a fixed cooling time following the start of injection, wherein said control apparatus is for controlling ejection temperature of the molded article to be ejected from the mold, said apparatus comprising:

first measuring means for measuring mold temperature in a molding cycle;

means for calculating a mean value of mold temperature in a period of time from start of injection until expiration of cooling time;

second measuring means for measuring the temperature of the resin supplied to the mold;

means for identifying a response model of a variation in molded-article ejection temperature using the calculated mean mold temperature and the measured molten resin temperature;

means for calculating a new cooling time, at which a molded article having a molded-article target ejection temperature is to be ejected, using the response model when the molding cycle is changed; and means for setting the new cooling time as the cooling time.

14. A method of estimating mold temperature in injection molding using an injection mold having mold cooling channels arranged around a cavity, in which a molten resin is adjusted in temperature in a temperature adjusting portion provided in a passage leading from an injection molding machine to the cavity, said method comprising the steps of:

measuring characteristic quantities of mold temperature in a molding cycle;

measuring coolant temperature of the cooling channels;

measuring the temperature of the molten resin maintained in the temperature adjusting portion;

identifying a response model of a variation in mold temperature using measured values obtained at the foregoing measurement steps; and estimating what the mold temperature will be in the future using the response model.

15. The method according to claim 14, further comprising a step of calculating a target value of coolant temperature, which is for holding the mold temperature constant at the start of injection, using the response model in a case where there is a cause of fluctuation in mold temperature at the start of injection.

16. A method of estimating resin temperature in injection molding comprising the steps of:

arranging a hot-runner portion for adjusting the temperature of a molten resin in a passageway leading from an injection molding machine to a cavity of an injection mold, and a heater in the hot runner portion for heating the molten resin residing in the hot-runner portion;

measuring the temperature of the molten resin held in the hot-runner portion;

identifying a response model of a variation in molten resin temperature in the hot-runner portion using the measured temperature of the molten resin and a target temperature of the molten resin to be heated by the heater; and estimating what the resin temperature will be in the future using the response model.

17. The method according to claim 16, further comprising the step of calculating a new target temperature of heating performed by the heater, in order to hold constant the molten resin temperature in the hot-runner portion, using the response model in a case where there is a cause of fluctuation in molten resin temperature in the hot-runner portion.

18. A method of estimating ejection temperature in injection molding in which a molten resin is injected into a mold and a molded article is ejected from the mold upon elapse of a fixed cooling time following the start of injection, said method comprising the steps of:

measuring mold temperature in a molding cycle;

calculating a mean value of mold temperature in a period of time from start of injection until expiration of cooling time;

measuring the temperature of the resin supplied to the mold;

identifying a response model of a variation in molded-article ejection temperature using the calculated mean mold temperature and the measured molten resin temperature; and estimating what ejection temperature will be in the future using the response model.

19. The method according to claim 18, further comprising a step of calculating a new cooling time, at which a molded article having a molded-article target ejection temperature is to be ejected, using the response model when the molding cycle is changed.

* * * * *